US012607750B2

(12) United States Patent
Kunz

(10) Patent No.: US 12,607,750 B2
(45) Date of Patent: Apr. 21, 2026

(54) SENSOR STEERING FOR MULTI-DIRECTIONAL LONG-RANGE PERCEPTION

(71) Applicant: Waymo LLC, Mountain View, CA (US)

(72) Inventor: Clayton Kunz, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 18/157,173

(22) Filed: Jan. 20, 2023

(65) Prior Publication Data

US 2023/0161047 A1    May 25, 2023

Related U.S. Application Data

(63) Continuation of application No. 16/723,693, filed on Dec. 20, 2019, now Pat. No. 11,592,575.

(51) Int. Cl.
G01S 17/931 (2020.01)
G01S 7/484 (2006.01)
(Continued)

(52) U.S. Cl.
CPC ............ G01S 17/931 (2020.01); G01S 7/484 (2013.01); G01S 17/02 (2013.01); G01S 17/06 (2013.01);
(Continued)

(58) Field of Classification Search
CPC ........ G01S 17/931; G01S 7/484; G01S 17/02; G01S 17/06; G01S 17/08; G01S 17/42; G01S 17/58; G01S 17/93
See application file for complete search history.

(56) References Cited

U.S. PATENT DOCUMENTS 7,676,087 B2    3/2010  Dhua et al.
8,077,081 B2    12/2011  Bateman et al.
(Continued)

FOREIGN PATENT DOCUMENTS

JP      2020516971 A      6/2020
WO      2011129830 A1     10/2011

OTHER PUBLICATIONS

Castano et al., "Obstacle Recognition Based on Machine Learning for On-Chip LiDAR Sensors in a Cyber-Physical System", Sensors, 2017, 14 pages.

*Primary Examiner* — Adam M Alharbi
(74) *Attorney, Agent, or Firm* — McDonnell Boehnen Hulbert & Berghoff LLP

(57) ABSTRACT

The present disclosure relates to systems, vehicles, and methods for adjusting a pointing direction and/or a scanning region of a lidar. An example method includes determining a plurality of points of interest within an environment of a vehicle. The method also includes assigning, to each point of interest of the plurality of points of interest, a respective priority score. The method additionally includes partitioning at least a portion of the environment of the vehicle into a plurality of sectors. Each sector of the plurality of sectors includes at least one point of interest. For each sector of the plurality of sectors, the method includes adjusting a scanning region of a lidar unit based on the respective sector and causing the lidar unit to scan the respective sector.

20 Claims, 17 Drawing Sheets

(51) Int. Cl.

| | |
|---|---|
| *G01S 17/02* | (2020.01) |
| *G01S 17/06* | (2006.01) |
| *G01S 17/08* | (2006.01) |
| *G01S 17/42* | (2006.01) |
| *G01S 17/58* | (2006.01) |
| *G01S 17/93* | (2020.01) |

(52) U.S. Cl.
CPC .............. *G01S 17/08* (2013.01); *G01S 17/42* (2013.01); *G01S 17/58* (2013.01); *G01S 17/93* (2013.01)

(56) References Cited

U.S. PATENT DOCUMENTS

| | | | |
|---|---|---|---|
| 8,346,480 B2 | 1/2013 | Trepagnier et al. | |
| 10,798,368 B2 | 10/2020 | Briggs et al. | |
| 11,346,951 B2 | 5/2022 | Lu et al. | |
| 11,449,067 B1 * | 9/2022 | Allais | ................ B60W 60/001 |
| 11,592,575 B2 | 2/2023 | Kunz | |

| | | | |
|---|---|---|---|
| 2008/0243389 A1 | 10/2008 | Inoue et al. | |
| 2010/0328644 A1 * | 12/2010 | Lu | ........................... H04N 23/57 356/5.01 |
| 2015/0348417 A1 * | 12/2015 | Ignaczak | ............... G08B 25/08 340/435 |
| 2017/0242117 A1 | 8/2017 | Izzat et al. | |
| 2018/0059248 A1 * | 3/2018 | O'Keeffe | ............... G01S 17/42 |
| 2018/0113200 A1 | 4/2018 | Steinberg et al. | |
| 2018/0218226 A1 | 8/2018 | Wellington et al. | |
| 2018/0373992 A1 | 12/2018 | Yin et al. | |
| 2019/0056484 A1 * | 2/2019 | Bradley | ............... G01S 7/4815 |
| 2019/0095721 A1 | 3/2019 | Ion et al. | |
| 2019/0155304 A1 | 5/2019 | Choi | |
| 2019/0178974 A1 | 6/2019 | Droz | |
| 2019/0204423 A1 * | 7/2019 | O'Keeffe | ............... G01S 17/89 |
| 2019/0277962 A1 | 9/2019 | Ingram et al. | |
| 2019/0317193 A9 | 10/2019 | O'Keeffe | |
| 2019/0317217 A1 | 10/2019 | Day et al. | |
| 2019/0317507 A1 | 10/2019 | Zhang et al. | |
| 2020/0284883 A1 * | 9/2020 | Ferreira | ............... G01S 7/4816 |
| 2021/0001810 A1 | 1/2021 | Rivard et al. | |

* cited by examiner

Priority Score Assignment
Point of Interest 306a = 10
Point of Interest 306b = 2
Point of Interest 306c = 6

Sector Visit Order
1. Sector 304a
2. Sector 304d
3. Sector 304c
4. Sector 304b Overhead View

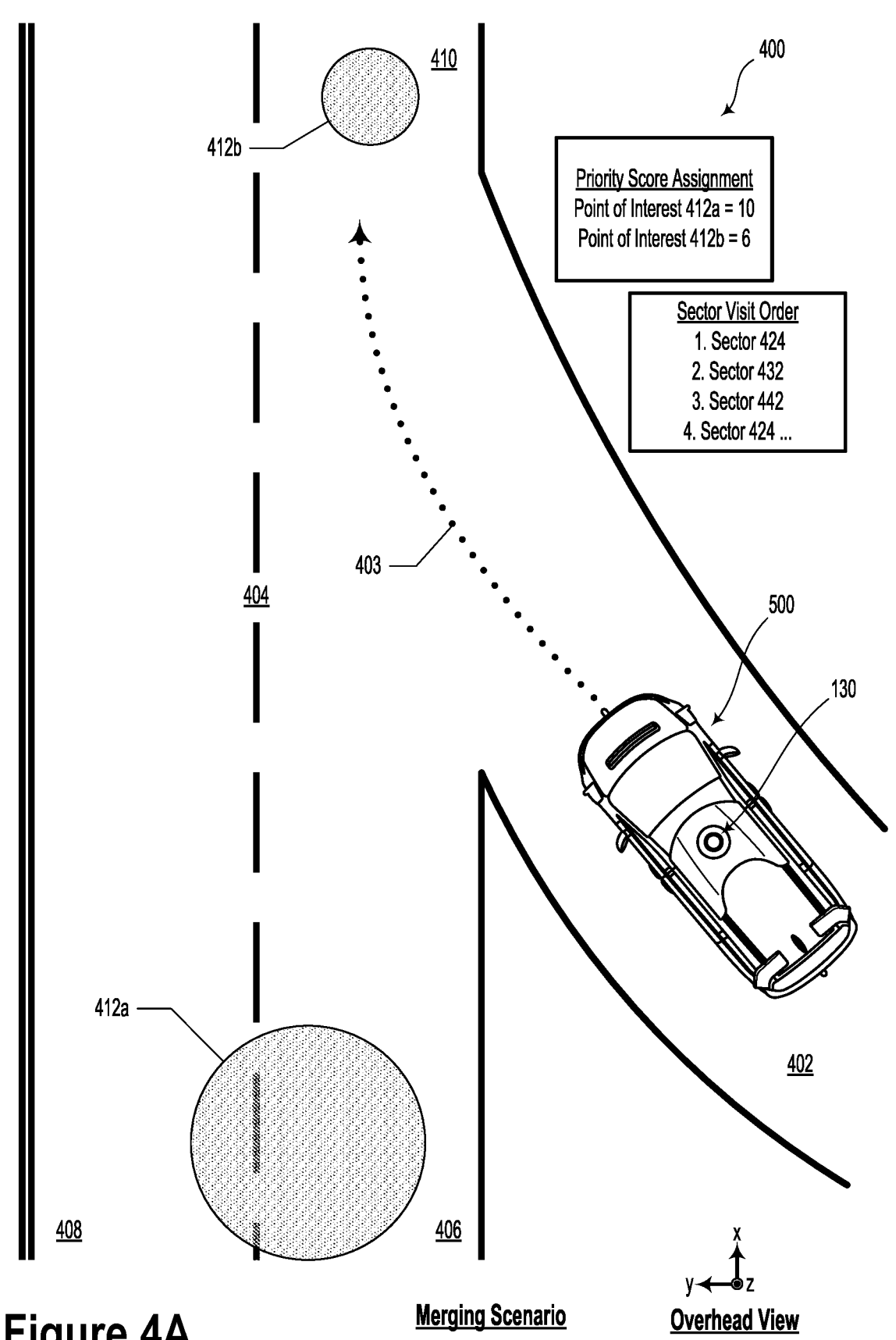
410
412b
400
Priority Score Assignment
Point of Interest 412a = 10
Point of Interest 412b = 6
Sector Visit Order
1. Sector 424
2. Sector 432
3. Sector 442
4. Sector 424 ...
500
130
404
403
402
412a
408
406
x
y ← z
Figure 4A          Merging Scenario          Overhead View Sector Visit Order
1. Sector 424
2. Sector 432
3. Sector 442
4. Sector 424 ...

Merging Scenario     Overhead View

Merging Scenario          Overhead View

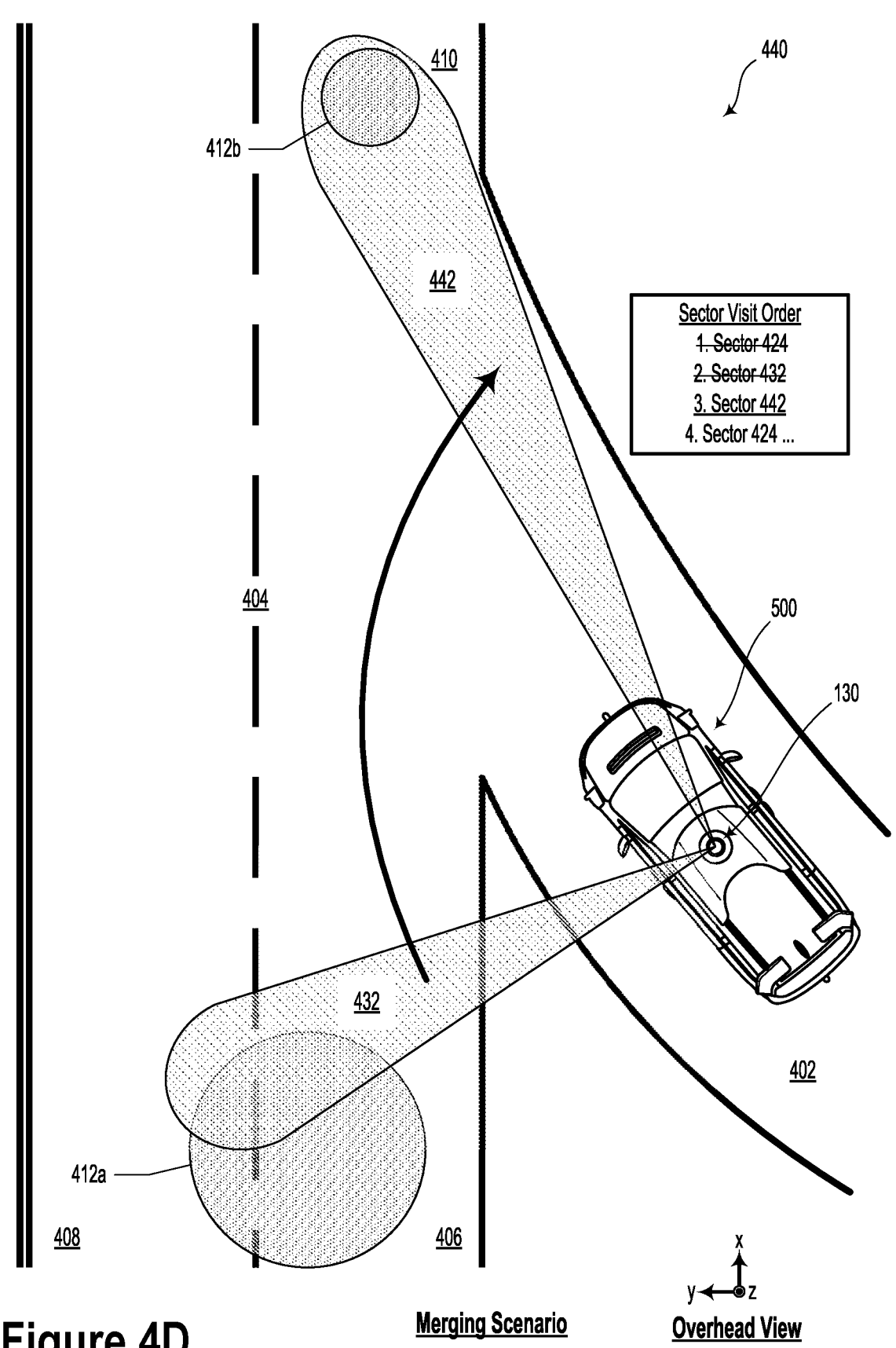
Figure 4D      <u>Merging Scenario</u>      <u>Overhead View</u>

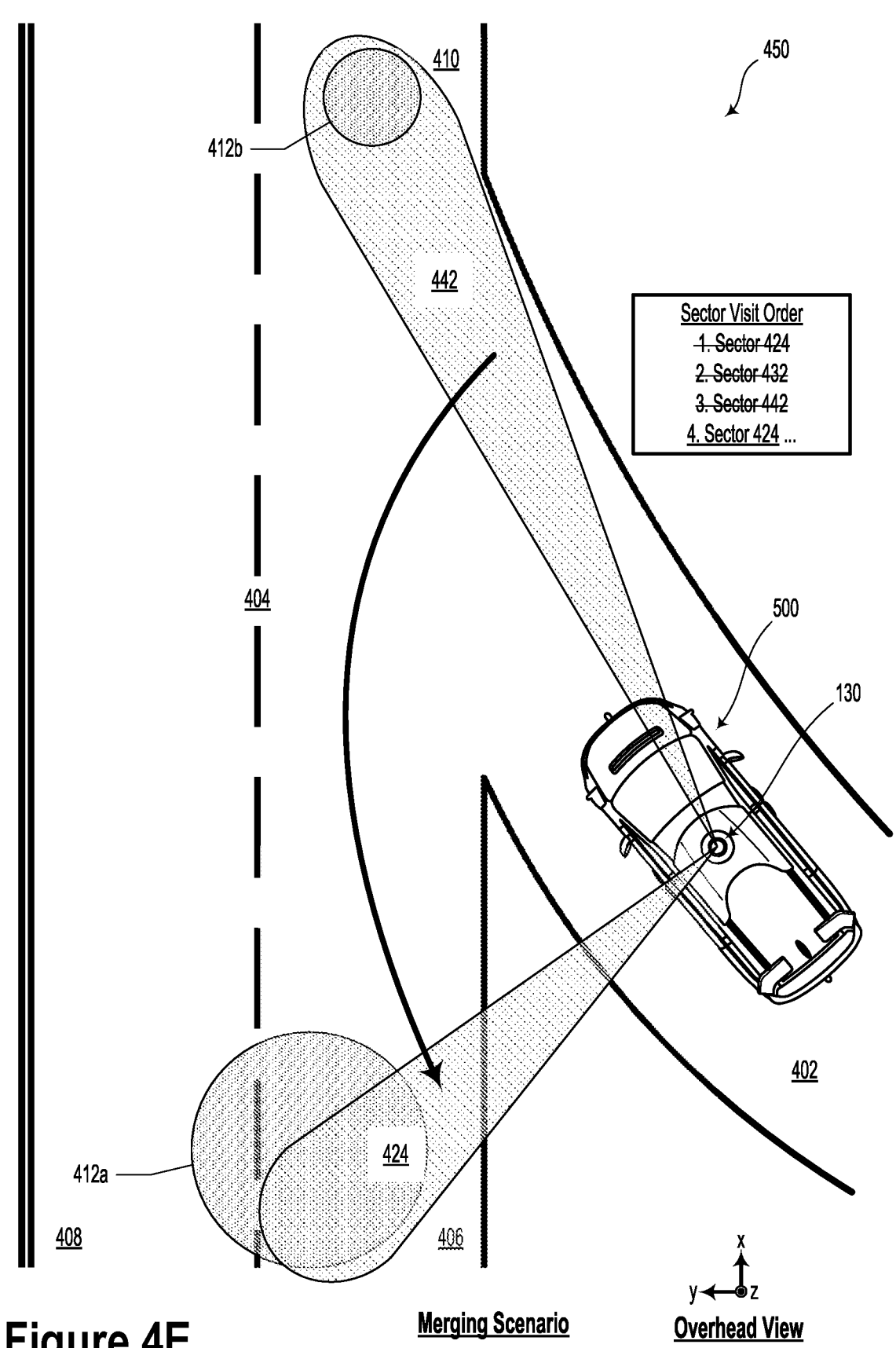
Sector Visit Order
1. Sector 424
2. Sector 432
3. Sector 442
4. Sector 424 ...
Figure 4E      Merging Scenario      Overhead View

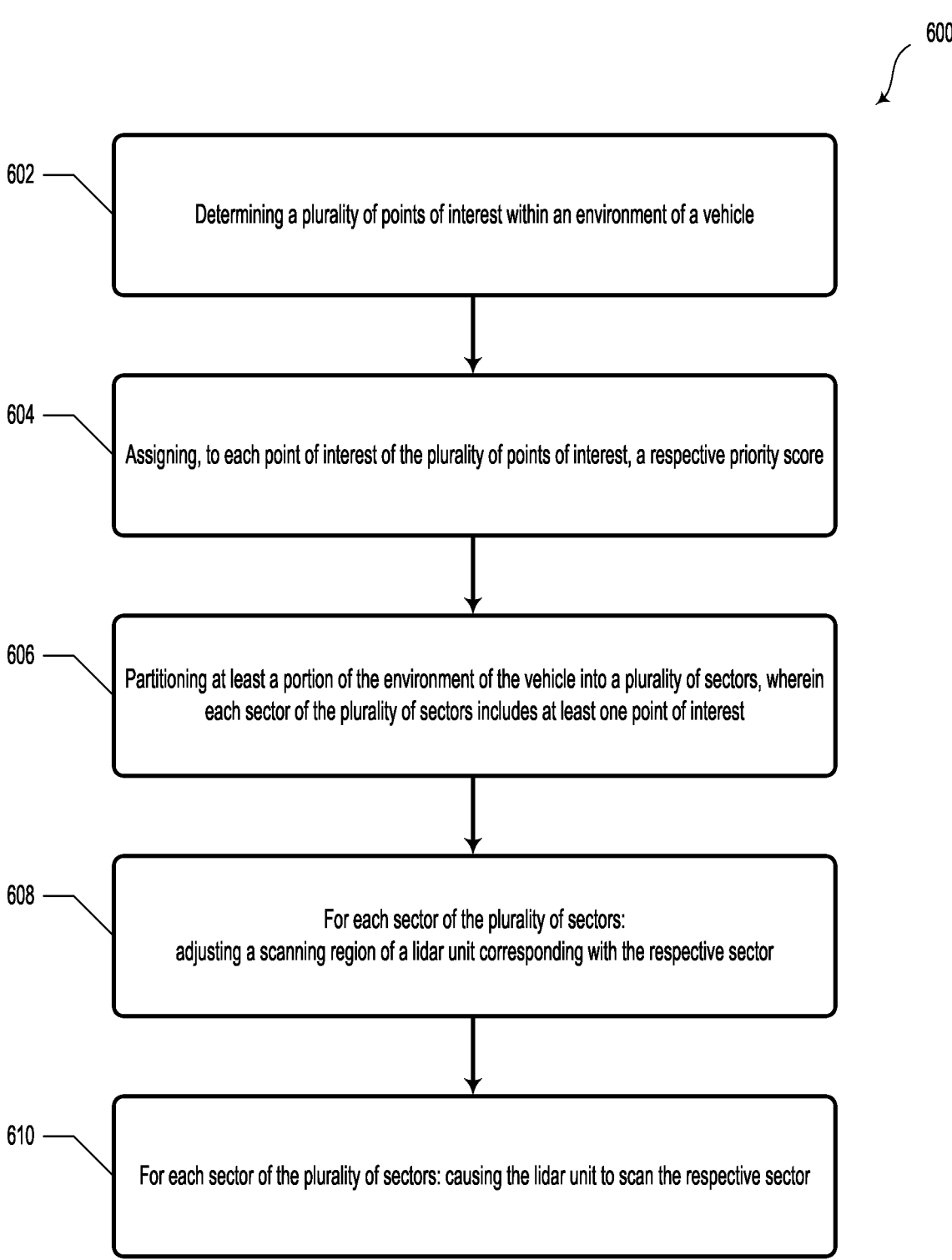

602 — Determining a plurality of points of interest within an environment of a vehicle 604 — Assigning, to each point of interest of the plurality of points of interest, a respective priority score 606 — Partitioning at least a portion of the environment of the vehicle into a plurality of sectors, wherein each sector of the plurality of sectors includes at least one point of interest 608 — For each sector of the plurality of sectors:
adjusting a scanning region of a lidar unit corresponding with the respective sector 610 — For each sector of the plurality of sectors: causing the lidar unit to scan the respective sector

SENSOR STEERING FOR MULTI-DIRECTIONAL LONG-RANGE PERCEPTION

CROSS-REFERENCE TO RELATED APPLICATIONS

This application is a continuation of U.S. patent application Ser. No. 16/723,693, filed Dec. 20, 2019, which is incorporated herein by reference.

BACKGROUND

Active sensors include devices that emit energy, which can reflect off environmental surroundings and can be measured upon return to the device. Active sensors include radar and lidar, among others. Such active sensors may be utilized in areas such as autonomous or semi-autonomous vehicles, robotics, mapping, and security applications.

SUMMARY

The present disclosure relates to systems, vehicles, and methods that involve adjustment of a steerable lidar unit based on points of interest within an environment.

In a first aspect, a system is provided. The system includes a planner unit having a planner controller operable to carry out operations. The operations include determining a plurality of points of interest within an environment of the system and assigning, to each point of interest of the plurality of points of interest, a respective priority score. The system also includes a perception unit with a perception controller operable to carry out operations. The operations include partitioning at least a portion of the environment of the system into a plurality of sectors. Each sector of the plurality of sectors includes at least one point of interest. The system also includes a lidar unit operable to adjust a scanning region to correspond with a respective sector of the plurality of sectors.

In a second aspect, a vehicle is provided. The vehicle includes a planner unit with a planner controller operable to carry out operations. The operations include determining a plurality of points of interest within an environment of the vehicle and assigning, to each point of interest of the plurality of points of interest, a respective priority score. The vehicle also includes a perception unit that has a perception controller operable to carry out operations. The operations include partitioning at least a portion of the environment of the vehicle into a plurality of sectors. Each sector of the plurality of sectors includes at least one point of interest. The vehicle also includes a lidar unit operable to adjust a scanning region to correspond with a respective sector of the plurality of sectors.

In a third aspect, a method is provided. The method includes determining a plurality of points of interest within an environment of a vehicle and assigning, to each point of interest of the plurality of points of interest, a respective priority score. The method also includes partitioning at least a portion of the environment of the vehicle into a plurality of sectors. Each sector of the plurality of sectors includes at least one point of interest. The method includes, for each sector of the plurality of sectors, adjusting a scanning region of a lidar unit corresponding with the respective sector. The method also includes, for each sector of the plurality of sectors, causing the lidar unit to scan the respective sector.

Other aspects, embodiments, and implementations will become apparent to those of ordinary skill in the art by reading the following detailed description, with reference where appropriate to the accompanying drawings.

BRIEF DESCRIPTION OF THE FIGURES

FIG. 4A illustrates a scenario involving the system of FIG. 1, according to an example embodiment.

FIG. 4D illustrates a scenario involving the system of FIG. 1, according to an example embodiment.

FIG. 4E illustrates a scenario involving the system of FIG. 1, according to an example embodiment.

FIG. 6 illustrates a method, according to an example embodiment.

DETAILED DESCRIPTION

Figure 1:
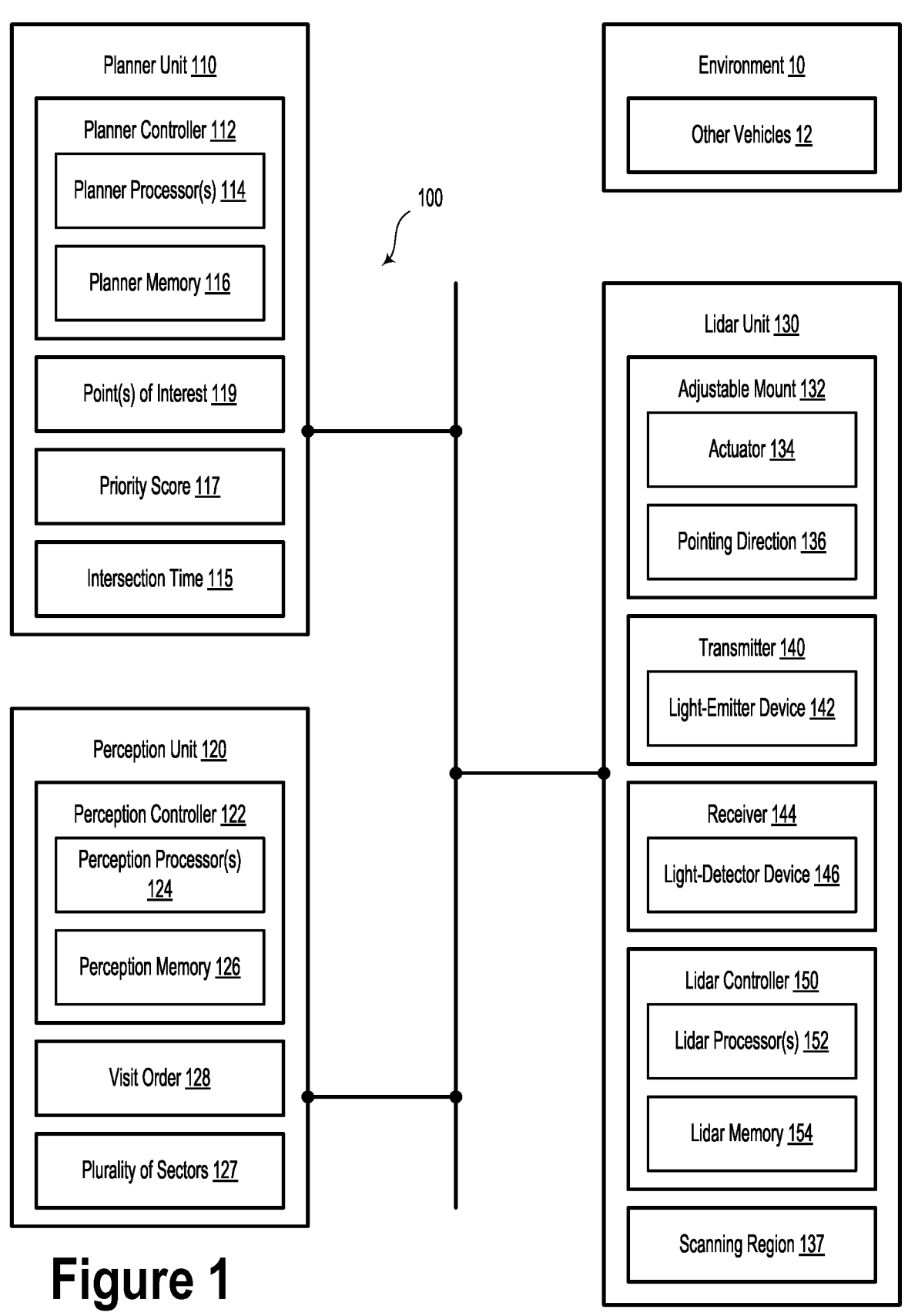
FIG. 1 illustrates a system, according to an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

Systems and methods described in various embodiments herein relate to long-range perception using a steerable light detection and ranging (lidar) device that has a limited angular field of view for a given position (e.g., a given azimuthal position). Such systems and methods could be utilized in semi- or fully-autonomous vehicles, such as with self-driving cars and trucks. In such scenarios, the steerable lidar points in one direction at any particular time. However, vehicles that utilize trajectory and/or route planning may benefit from long range visibility in multiple directions at once, or within a brief period of time (e.g., within 3 seconds or less). For example, when making a left turn onto a major road, it may be beneficial for a vehicle to sense oncoming traffic at long range both from the left and from the right, and possibly also from straight ahead.

In some embodiments, a method for obtaining information about several regions of interest within a short period of time could be carried out as follows:

1. A planner unit creates a list of points of interest within an environment of a sensing vehicle. Each point of interest describes a single location or region in space to be scanned in order to detect, for example, other vehicles, pedestrians, or other moving or non-moving objects. In some embodiments, each point could be assigned a priority score. The priority score for each point could correspond roughly to an inverse of the amount of time it would take for a moving object (e.g., another vehicle) at that point following the road to intersect with a trajectory of the sensing vehicle. As an example, systems and methods described herein could take into account an actual or predicted (e.g., typical average or maximum) speed of other vehicles. As an example, present systems and methods could have information about posted speed limits and/or average speeds of traffic on nearby roadways. Additionally or alternatively, present system and methods could receive information about current or future weather or road conditions. In such a scenario, the less time the sensing vehicle will have to react to a moving object approaching from the given point of interest, the higher the priority score. That is, a first point of interest 100 meters away along a foggy roadway with a posted speed limit of 60 miles per hour may be assigned a higher priority score than that of a second point of interest 100 meters away along a clear roadway with a posted speed limit of 30 miles per hour. In other terms, higher priority scores may be assigned to points of interest corresponding to scenarios where an amount of reaction time or collision avoidance time is lower, a risk of a collision is higher, a traffic density is higher, etc.

2. A perception unit collects all of these points of interest (and corresponding priority scores) and partitions or divides at least a portion of the environment into sectors centered at the self-driving car's location. Each sector may have an azimuthal angular width that corresponds to the angular field of view of the lidar (e.g., between 5-15 degrees in azimuth). The algorithm that does this grouping may collect or aggregate as many points as possible within each sector, and may seek to maximize overlap between adjacent sectors. For example, if the points of interest cannot fit into a single 8 degree sector, but could fit into a single 12 degree sector, the perception unit may create two different 8 degree sectors that overlap in the center 4 degrees. In such scenarios, some points may be located within both sectors and will therefore be detected more frequently. In some embodiments, the grouping algorithm that collects or aggregates points of interest into sectors could include a clustering or aggregation algorithm such as a K-means algorithm (e.g., Lloyd's algorithm), affinity propagation clustering algorithm, or another type of algorithm that utilizes the physical distance between points of interest and/or the vehicle position/orientation to partition the environment into sectors.

3. The perception unit then schedules the lidar to point to different sectors based on a prediction of how long the lidar would need to scan a given sector in order for a perception object to be created (e.g., the amount of time needed to scan a given sector before the perception unit would be expected to recognize a given object). The perception unit allows the lidar to "dwell" on a particular sector for enough time that an object of interest within the sector will be detected with high likelihood by the lidar before the lidar is steered to a different sector. In some embodiments, the lidar may dwell for about 0.75 seconds on each sector. Other dwell times (e.g., between 500 milliseconds and 2 seconds) are possible and contemplated. Additionally or alternatively, the amount of time that the lidar may dwell on each sector could be variable. Furthermore, the dwell time could be dynamically adjustable, based on, for example, weather conditions, time of day, current or historic traffic patterns, current lidar system performance, sector size/volume, distance to point of interest, availability of backup sensor systems to cover a given point of interest, etc.

The algorithm that schedules the steering ensures that "high priority" sectors (e.g., those containing points with expected trajectory intersection times less than about six seconds) will be visited, but may ignore sectors with lower priority points if there are too many sectors to ensure that they can all be visited in a timely fashion. In some embodiments, the scheduling algorithm may include a priority-based scheduling algorithm. For example, the priority-based scheduling algorithm could include an earliest deadline first (EDF) or least time-to-go dynamic scheduling algorithm. For example, from among a plurality of potential sectors to scan, the scheduling algorithm may select the sector with the highest priority (effectively the sector with the least potential intersection time). Additionally or alternatively, the scheduling algorithm could include a first come first serve (FCFS) scheduling algorithm, a shortest job first (SJF) scheduling algorithm, or a round robin (RR) scheduling algorithm, among other possibilities.

In some embodiments, the described systems and methods could represent a way to more safely navigate vehicular situations in which other vehicles may be approaching from multiple directions. In particular, the lidar may move back and forth to point at oncoming traffic from different directions. In some implementations, this behavior could emerge from the described method without such "back and forth" motion being specifically programmed.

The perception unit's aggregation of points into sectors may attempt to minimize the total number of sectors that are steered to. In such scenarios, more time could be spent doing perception on relevant locations of interest and less time may be spent mechanically driving the lidar sensor to a new target area. For example, each time the sensor is moved to a new pointing direction, 0.25 second or more of sensor repointing time could take up time that could otherwise be spent perceiving the scene.

Based on some lidar hardware and sampling rates, the perception unit may "know" that there is sufficient time to steer between 3 different sectors before starting to push the limits of what the planner unit can process using the lidar alone. However, if movement between more than three sectors is needed, too much time might be spent looking away from a given sector for the planner unit to be confident enough that the sector is clear to be able to safely proceed. This situation may be taken into account, with the result that some sectors may be dropped from the lidar movement schedule altogether. For example, the two highest priority sectors may be included at all times. However, if more than two sectors are required, then the lowest priority sectors could be dropped and only the highest priority sectors may be retained by in the sector schedule. While two or three sectors are described in examples herein, it will be understood that the perception unit may alternatively schedule a variable number of sectors (e.g., 3, 5, 15, or more sectors). For example, the perception unit may review a specific set of sectors and dwell times and determine whether a particular scan plan is sufficient or not. Based on the sector review, the perception unit may schedule additional sectors to visit, or may otherwise adjust the sector visit order.

In some cases, even if the lidar does not have enough time to scan each sector over a given period of time, the overall system may still be able proceed (e.g., move the vehicle) in many cases because radar or other sensors (e.g., other lidar sensors) can be used to scan the areas that are not scanned by the lidar.

In various embodiments, the systems and methods described herein could be applied to lidars with or without affecting their steering (e.g., physical orientation). For example, adjusting a scanning region of the lidar unit could include a redistribution of light pulse power to a respective sector. In such scenarios, sectors having higher priority may be illuminated, while the lower priority sectors could be dropped in some cases. In other words, the systems and methods herein could be applied to other ways to dynamically refocus, redirect, and/or reprioritize lidar regions of interest, including dynamic power modulation, dynamically adjustable focal distance/depth of field, among other possibilities.

II. Example Systems

FIG. 1 illustrates a system 100, according to an example embodiment. The system 100 includes a planner unit 110, a perception unit 120, and a lidar unit 130.

The planner unit 110 includes a planner controller 112, which may include a planner processor 114 that executes program instructions stored in a planner memory 116. As such, the planner controller 112 could be operable to carry out planner operations. The planner operations include determining a plurality of points of interest 119 within an environment 10 of the system. In some embodiments, the points of interest 119 could correspond to locations from which one or more other vehicles 12 are likely to approach the system 100. In other scenarios, the points of interest 119 could correspond to locations that may be associated with the potential or actual presence of pedestrians, motorcyclists, bicyclists, or other objects.

The planner operations also include assigning, to each point of interest of the plurality of points of interest, a respective priority score 117.

In some embodiments, the planner operations of the planner controller 112 may additionally include determining, for each point of interest 119, a respective intersection time 115. The respective intersection time 115 is based on when another vehicle 12 approaching from the respective point of interest 119 is predicted to intersect a current trajectory or a potential trajectory of the system 100.

In such scenarios, the respective priority scores 117 could be inversely proportional to the respective intersection time 115. For example, if a given point of interest 119 is associated with vehicles that approach at a high rate of speed, the assigned priority score will be higher than that of a point of interest 119 substantially the same distance away that is associated with vehicles that approach at a lower rate of speed. In such examples, priority scores 117 may be assigned based on other information. For example, priority scores may be assigned based on actual speeds of oncoming vehicles from around the given point of interest 119. Additionally or alternatively, priority scores could be assigned based on object information from prior images or point cloud information at the same location and/or similar environment scenarios (e.g., similar traffic patterns, roadways, and/or intersection types).

The perception unit 120 includes a perception controller 122, which may include a perception processor 124 that executes program instructions stored in a perception memory 126. In such scenarios, the perception controller 122 could be operable to carry out perception operations. The perception operations include partitioning the environment 10 of the system 100 into a plurality of sectors 127. Each sector of the plurality of sectors 127 includes at least one point of interest 119.

In some embodiments, partitioning the environment 10 of the system 100 into the plurality of sectors 127 could be based on the assigned priority score 117 of at least one point of interest 119. In some embodiments, each sector of the plurality of sectors 127 could include a predetermined azimuth angle range. As an example, the predetermined azimuth angle range could be between five degrees and fifteen degrees.

In various embodiments, the perception operations of the perception controller 122 could additionally include determining a visit order 128 of the plurality of sectors 127. In such scenarios, determining the visit order 128 could be based on a variety of different factors. For example, the visit order 128 could be determined based on a number of points of interest in a given sector. In such cases, multiple points of interest could be grouped into a single sector to more efficiently scan the particular sector of the environment 10. Additionally or alternatively, the visit order 128 may be determined based on the respective priority scores 115 for the points of interest 119 in a given sector. For example, the visit order 128 could be based on the estimated or actual intersection time 115. In such scenarios, the visit order 128 could be determined based on how fast vehicles are predicted to approach from a particular location of roadway.

In other embodiments, the visit order 128 could be determined based on an angular slew rate of the adjustable mount 132 of the lidar unit 130. That is, an amount of time needed to rotate the adjustable mount 132 from an initial pointing direction to a desired pointing direction could be taken into account when assigning the visit order 128. In such scenarios, a sector could be ignored or scanned by another sensor in cases where the amount of time needed to slew the lidar unit 130 to the desired scanning region (corresponding to a desired pointing direction) would be greater than a respective predicted intersection time 115 for objects approaching from the given sector.

Additionally or alternatively, the visit order 128 could be determined based on an actual azimuthal angle of respective sectors of the plurality of sectors and/or an azimuthal angle difference between respective sectors of the plurality of sectors. For example, the visit order 128 could be assigned so as to sweep the pointing direction 136 of the lidar unit 130 through multiple sectors (e.g., instead of dithering between short clockwise and counterclockwise azimuthal movements).

The lidar unit 130 includes an adjustable mount 132. The adjustable mount 132 is operable to rotate the lidar unit 130 toward a respective sector of the plurality of sectors 127.

In some embodiments, the system 100 could include an actuator 134 operable to rotate the lidar unit 130 to an azimuthal angle corresponding to the respective sector of the plurality of sectors 127.

In various embodiments, the lidar unit 130 could also include a transmitter 140 having at least one light-emitter device 142. The lidar unit 130 may also include a receiver 144 having at least one light-detector device 146. Additionally or alternatively, the lidar unit 130 may include a lidar controller 150, which may include a lidar processor 152 that executes program instructions stored in a lidar memory 154.

The lidar controller 150 could be operable to carry out certain lidar operations. For example, the lidar operations could include scanning each respective sector of the plurality of sectors 127 by emitting at least one light pulse into the respective sector.

In some embodiments, the lidar operations may also include receiving at least one reflected light pulse from the environment 10.

In such scenarios, the lidar operations could include determining, based on an emission time of the at least one light pulse, a time of flight of the reflected light pulse. Based on the determined time of flight, the lidar operations could include determining a distance to an object (e.g., other vehicles 12) in the respective sector based on the time of flight.

Figure 2:
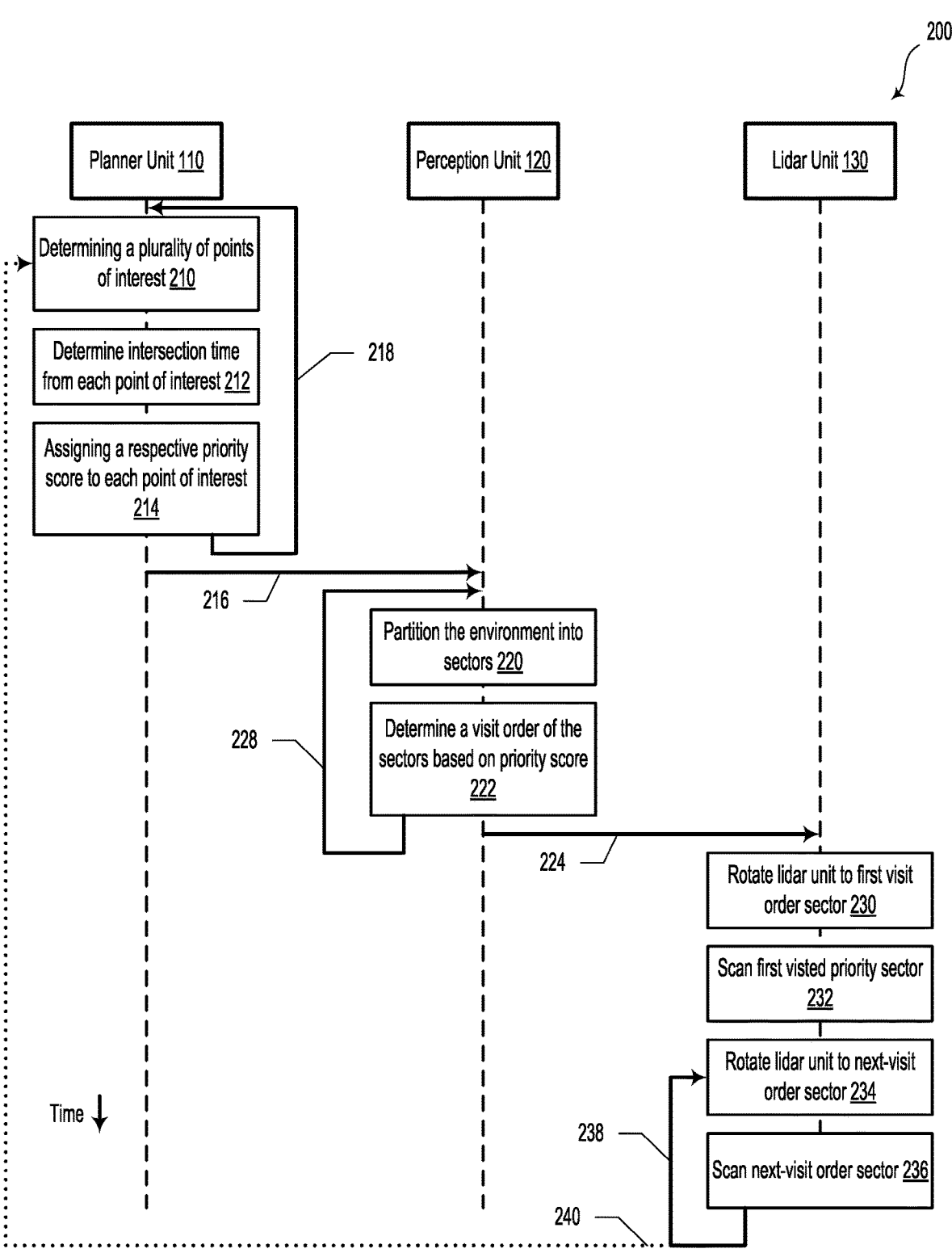
FIG. 2 illustrates various operations involving the system of FIG. 1, according to an example embodiment.

FIG. 2 is a "swimlane"-type diagram that illustrates various operations 200 involving elements of system 100 of FIG. 1, according to an example embodiment. While the various operations 200 or blocks are illustrated as being carried out by specific elements of the system 100 (e.g., planner unit 110, perception unit 120, lidar unit 130, or other computing devices), it will be understood that some operations or blocks could be carried out by other elements of system 100. Additionally, it will be understood that, in some embodiments, the planner unit 110, the perception unit 120, and/or the lidar unit 130 could be physically and/or communicatively combined into one or more units.

Operation 210 includes the planner unit 110 determining a plurality of points of interest within the environment 10 of the system 100.

Operation 212 includes the planner unit 110 determining an intersection time from each point of interest.

Operation 214 includes the planner unit 110 assigning, based on at least the respective intersection time from operation 212, a respective priority score to each point of interest.

In example embodiments, operation 216 could include transmitting information indicative of the points of interest, intersection times, and/or priority scores to the perception unit 120. Additionally or alternatively, operation 218 could include repeating operations 210, 212, and 214 according to a periodic or aperiodic planner schedule.

Operation 220 includes the perception unit 120 partitioning the environment into a plurality of sectors.

Operation 222 includes the perception unit 120 determining a visit order of the sectors based on the priority score of respective points of interest within the given sector.

Operation 224 includes the perception unit 120 transmitting information indicative of the visit order and/or the sectors to the lidar unit 130.

Operation 228 includes repeating operations 220 and 222 according to a periodic or aperiodic perception schedule.

Operation 230 includes the lidar unit 130 rotating to the first visit order sector. In such scenarios, a rotatable housing could rotate a pointing direction of the lidar unit 130 toward an azimuthal direction associated with the first visit order sector.

Operation 232 includes the lidar unit 130 scanning the first visit order sector. In some embodiments, scanning a given sector could include emitting a plurality of light pulses toward various locations within the sector, and receiving a plurality of return pulses. In some embodiments, scanning the given sector could include measuring a time of flight between emission of the light pulses and the time at which the corresponding return pulse is received.

Operation 234 may include rotating the lidar unit 130 in azimuthal angle toward the next sector in visit order.

Operation 236 could include scanning the next sector. Operation 238 could include repeating operations 230, 232, 234 and/or 236 according to a period or aperiodic lidar scanning schedule. Operation 240 could include repeating some or all of the various operations 200.

Figure 3A:
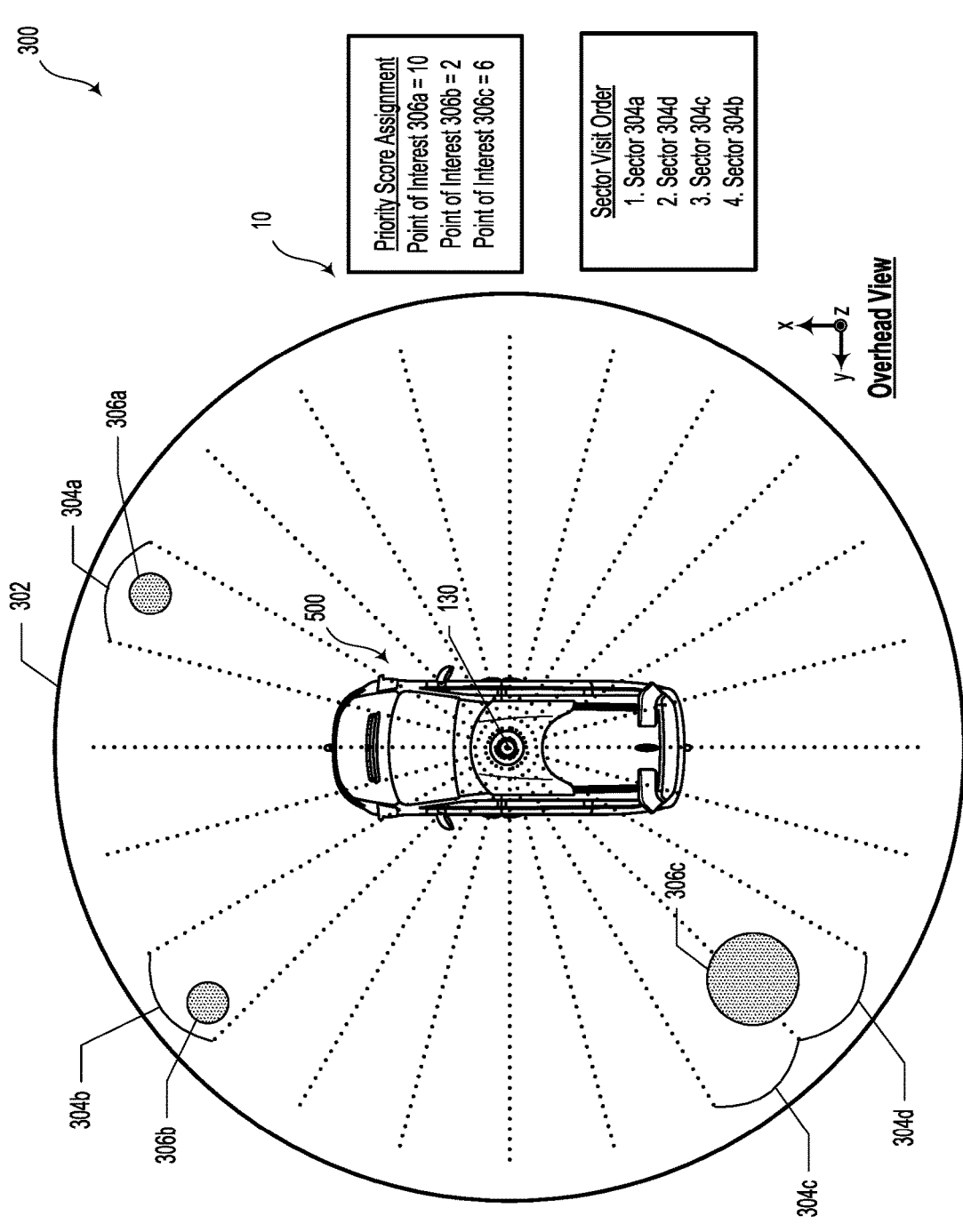
FIG. 3A illustrates a scenario involving the system of FIG. 1, according to an example embodiment.

FIG. 3A illustrates a scenario 300 involving the system 100 of FIG. 1, according to an example embodiment. As an example, the planner unit 110 could generate a list of points of interest (e.g., points of interest 306a, 306b, and 306c) within an environment 10 of a vehicle 500. In such scenarios, each point of interest 306a, 306b, and 306c could relate to a single location or region in space for which the planner unit 110 seeks further information. For example, points of interest 306a, 306b, and 306c could relate to another vehicle, a pedestrian, a moving object, a stationary object, or another type of object.

In some embodiments, each point of interest could be assigned a priority score that may correspond roughly to an inverse of the amount of time it would take for an object, such as another vehicle or another type of moving object at that location following a predicted trajectory, to intersect with the trajectory of vehicle 500. For example, point of interest 306a could be assigned a priority score of 10 (e.g., corresponding to a fast-approaching vehicle), point of interest 306b could be assigned a priority of 2 (e.g., corresponding to a slow-moving pedestrian), and point of interest 306c could be assigned a priority score of 6 (e.g., corresponding to another vehicle overtaking from a left-hand lane).

Subsequently, the perception unit 120 may receive the points of interest (and the corresponding priority scores) and divide or partition at least a portion of the environment 10 into a plurality of sectors centered at the location of vehicle 500 (and/or centered at the location of lidar unit 130. In such a scenario, each sector could have an azimuthal angular width that is the same as the angular field of view of the lidar (e.g., between 5-15 degrees in azimuth). In other embodiments, the sectors could have an azimuthal angular width based on size of the points of interest and/or an angular extent of several points of interest. In such scenarios, the perception unit 120 may attempt to aggregate as many points as possible within each sector, and maximize overlap between adjacent sectors, when relevant. For example, if the points of interest cannot fit into a single 8 degree sector (e.g., point of interest 306c), but could fit into a single 12 degree sector, the perception unit 120 may create two different 8 degree sectors that overlap in the center 4 degrees. In such scenarios, some points may be located within both sectors and will therefore be detected more frequently. Other ways to partition the environment 10 around the vehicle 500 are contemplated and possible.

In the illustrated scenario 300, the partitioned sectors could include: 1) sector 304*a*, which corresponds to point of interest 306*a;* 2) sector 304*b*, which corresponds to point of interest 306*b*; and 3) sectors 304*c* and 304*d*, which correspond to point of interest 306*c*. Other portions of the environment 10 could also be partitioned into sectors or could remain unpartitioned.

Although not shown, scenario 300 could include the lidar unit 130 scanning sector 304*a* (highest priority score), then sectors 304*c* and 304*d* (next highest priority score), followed by sector 304*b* (lowest priority score). It will be understood that while scenario 300 includes three different points of interest, some scenarios may include greater or lesser numbers of points of interest and corresponding sectors. The following scenarios illustrate other potential real-world examples.

Figure 3B:
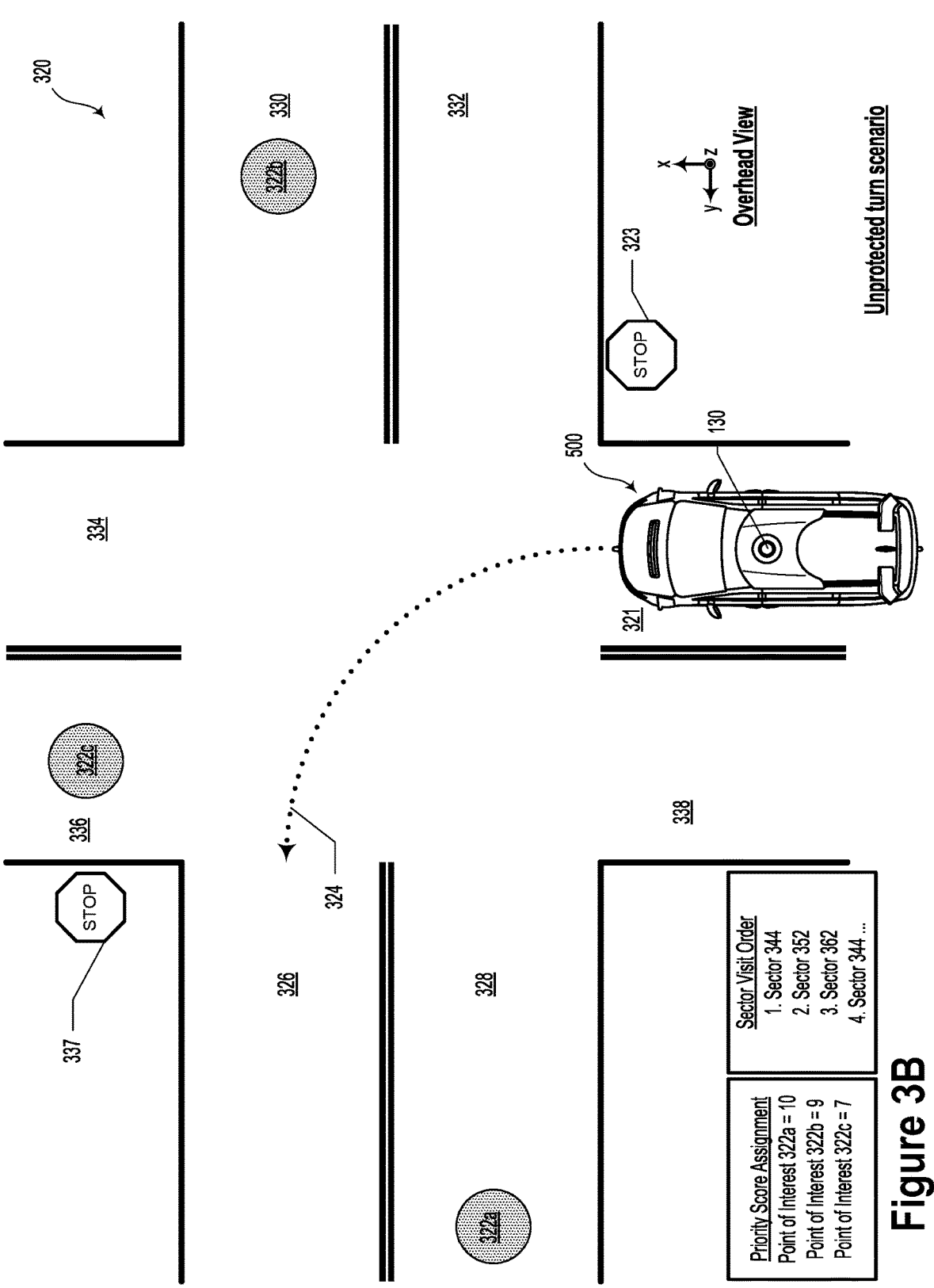
FIG. 3B illustrates a scenario involving the system of FIG. 1, according to an example embodiment.

FIG. 3B illustrates a scenario 320 involving the system 100 of FIG. 1, according to an example embodiment. Scenario 320 could be based on an unprotected left hand turn where a vehicle 500 in roadway 321 is waiting at a stop sign 323 with the intention of proceeding along trajectory 324. While roadway 336 has a stop sign 337, the other roadways do not have a stop. Such a scenario could be similar or identical to an intersection with a two-lane highway.

In such an example, three main roadway portions to check are roadway 328 (oncoming traffic from the left), roadway 330 (oncoming traffic from the right), and roadway 336 (oncoming traffic from the front). Other roadways portions (e.g., roadway 334, 332, 326, and 338 are less important because vehicles in those roadway portions are not likely to intersect (e.g., potentially collide) with the vehicle 500 or the intended trajectory 324.

Accordingly, the planner unit 110 may assign three points of interest 322*a*, 322*b*, and 322*c*. Furthermore, the planner unit 110 may assign respective priority scores of 10, 9, and 7, which could be substantially inversely proportional to the speed limit or average speed of hypothetical vehicles approaching vehicle 500 or intended trajectory 324 from the respective points of interest. For example, other vehicles approaching from points of interest 322*a* and 322*b* could be traveling at approximately 60 miles per hour, while other vehicles approaching from point of interest 322*c* may approach at 30 miles per hour.

Although not illustrated, the perception unit 120 could partition the environment into three different sectors corresponding to the three different points of interest 322*a*, 322*b*, and 322*c*. In some embodiments, the sector visit order could be assigned based on the priority score of the respective points of interest in the sector.

Figure 3C:
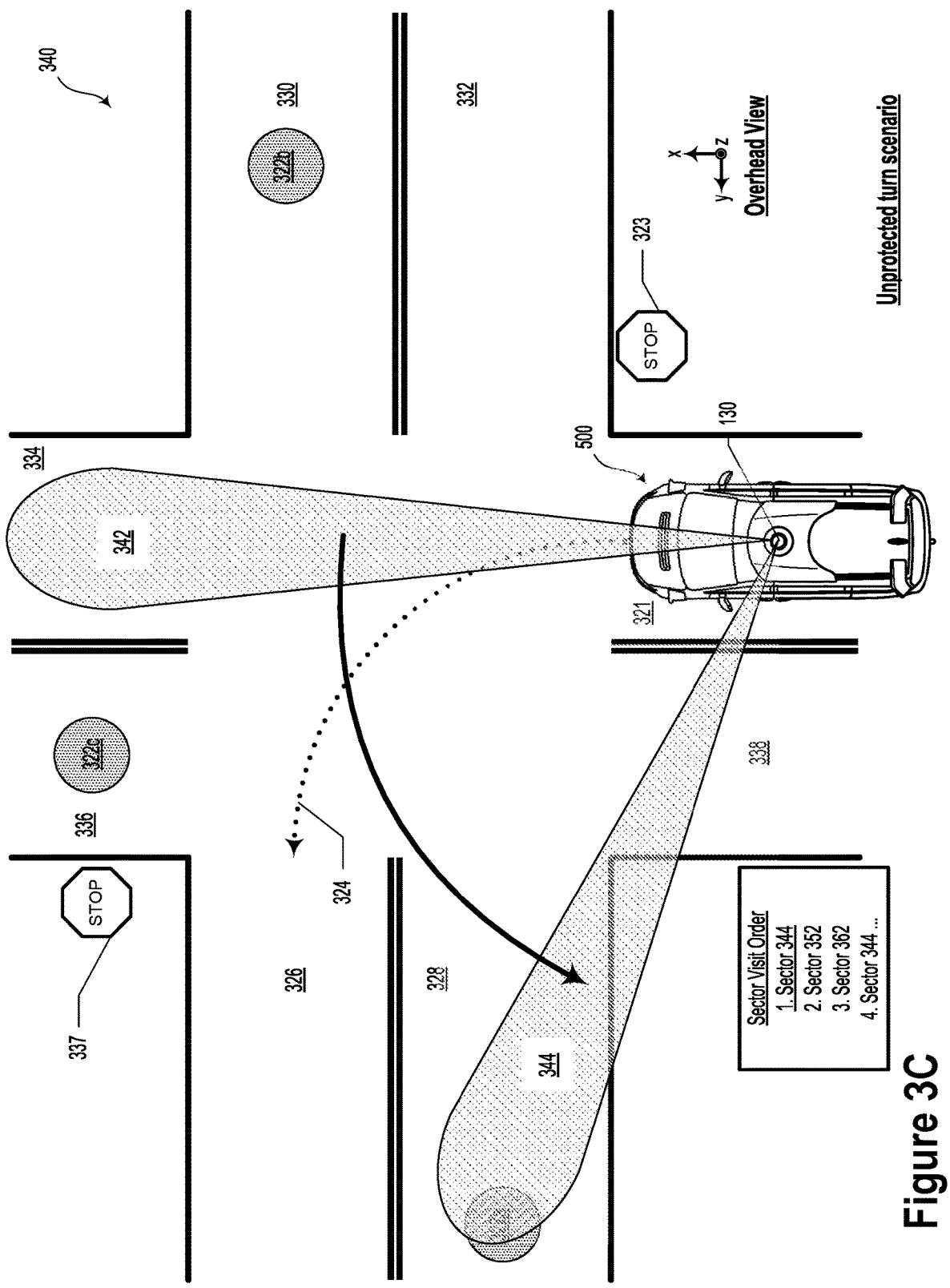
FIG. 3C illustrates a scenario involving the system of FIG. 1, according to an example embodiment.

FIG. 3C illustrates a scenario 340 involving the system 100 of FIG. 1, according to an example embodiment. In such a scenario, the lidar unit 130 of system 100 may rotate an adjustable mount in azimuthal angle from initial sector 342 to sector 344, which includes the point of interest 322*a* with the highest priority score of 10. Scenario 340 may include the lidar unit 130 scanning within the sector 344 so as to obtain information about potential objects (or absence thereof).

Figure 3D:
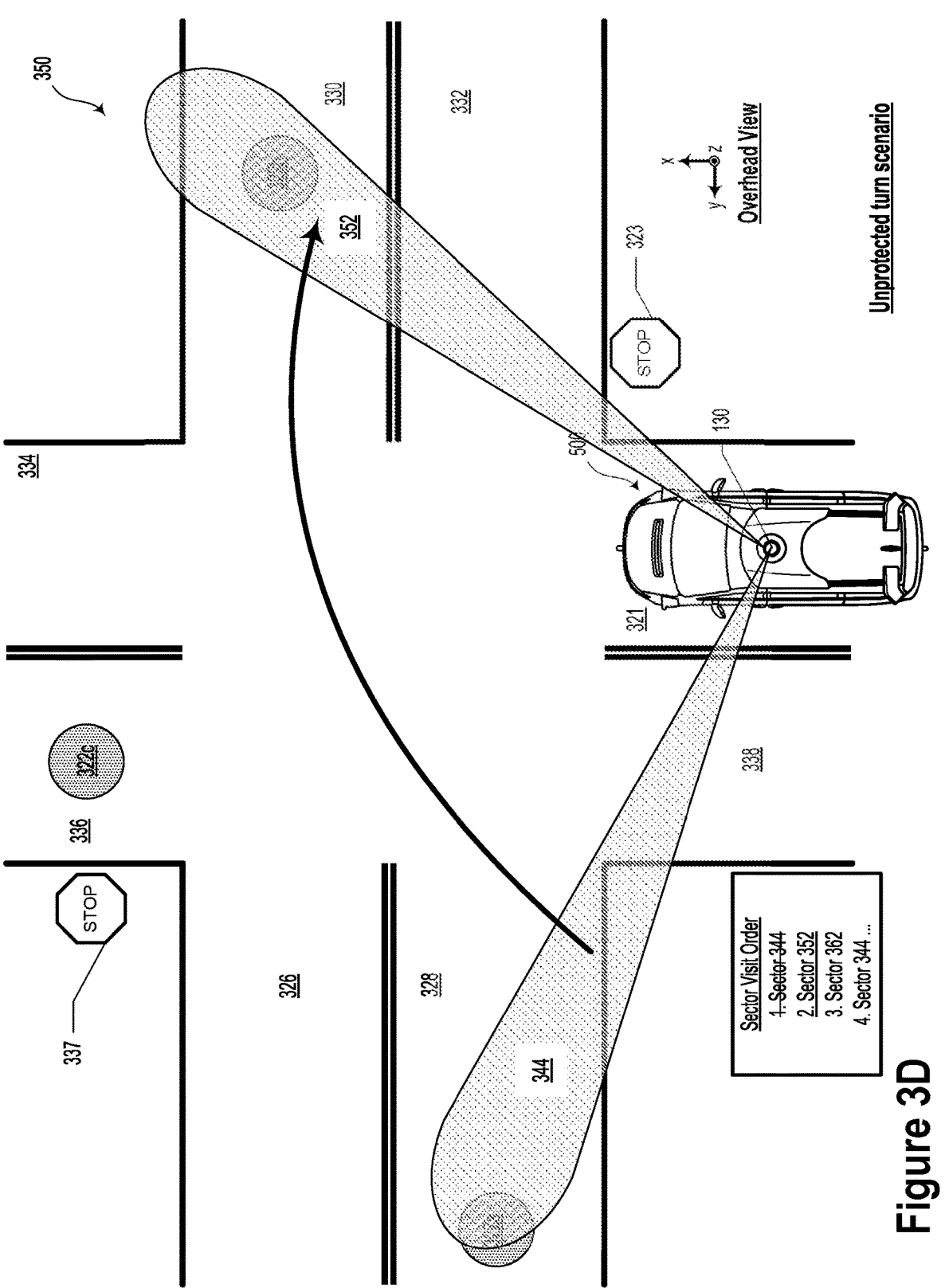
FIG. 3D illustrates a scenario involving the system of FIG. 1, according to an example embodiment.

FIG. 3D illustrates a scenario 350 involving the system 100 of FIG. 1, according to an example embodiment. In such a scenario, the lidar unit 130 of system 100 may rotate or slew an adjustable mount in azimuthal angle from sector 344 to sector 352, which includes the point of interest 322*b* with the second-highest priority score of 9. Scenario 350 may include the lidar unit 130 scanning within the sector 352 so as to obtain information about potential objects (or absence thereof).

Figure 3E:
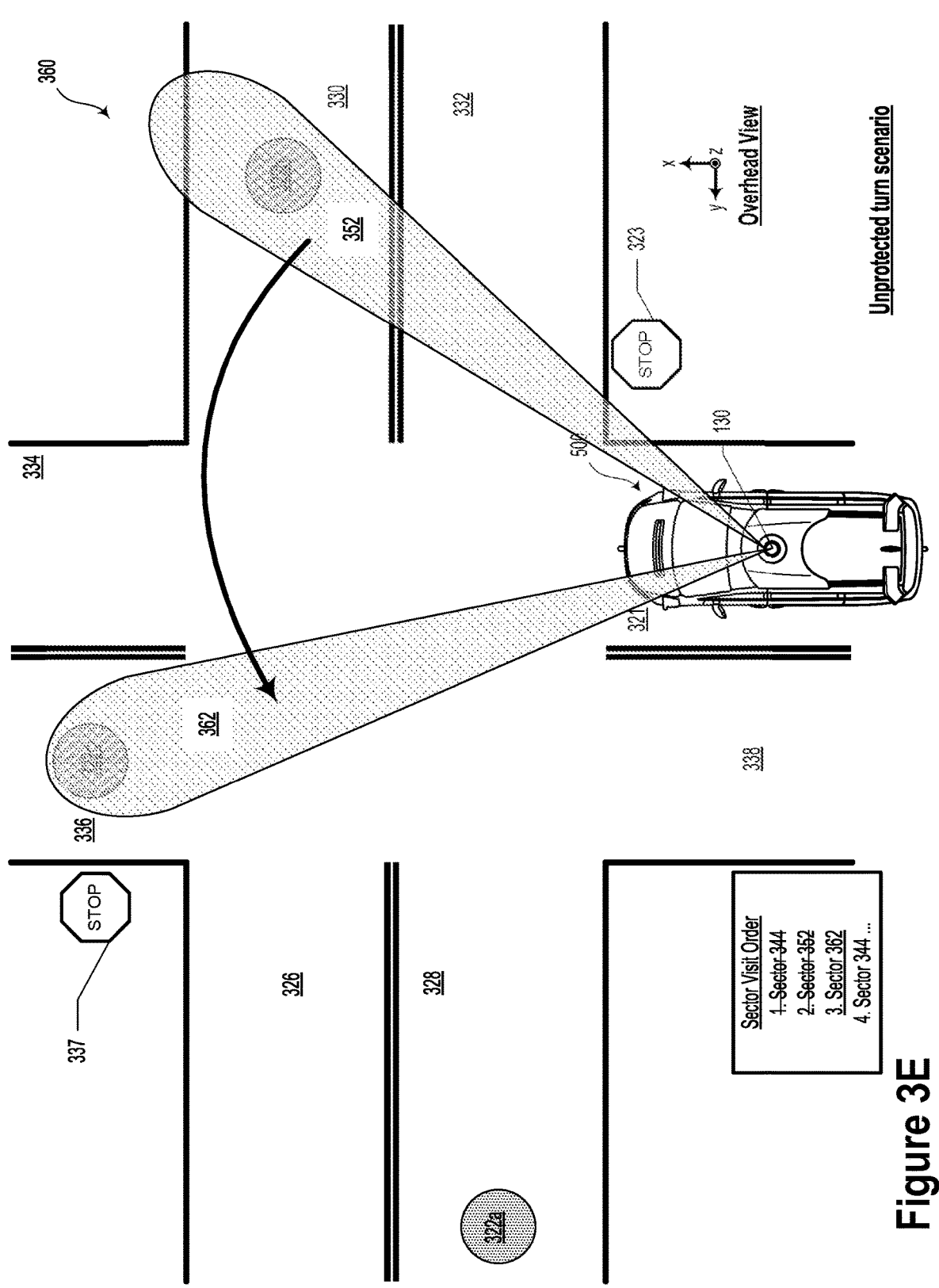
FIG. 3E illustrates a scenario involving the system of FIG. 1, according to an example embodiment.

FIG. 3E illustrates a scenario 360 involving the system 100 of FIG. 1, according to an example embodiment. In such a scenario, the lidar unit 130 of system 100 may rotate or slew an adjustable mount in azimuthal angle from sector 352 to sector 362, which includes the point of interest 322*c* with the lowest priority score of 7. Scenario 360 may include the lidar unit 130 scanning within the sector 362 so as to obtain information about potential objects (or absence thereof).

Figure 3F:
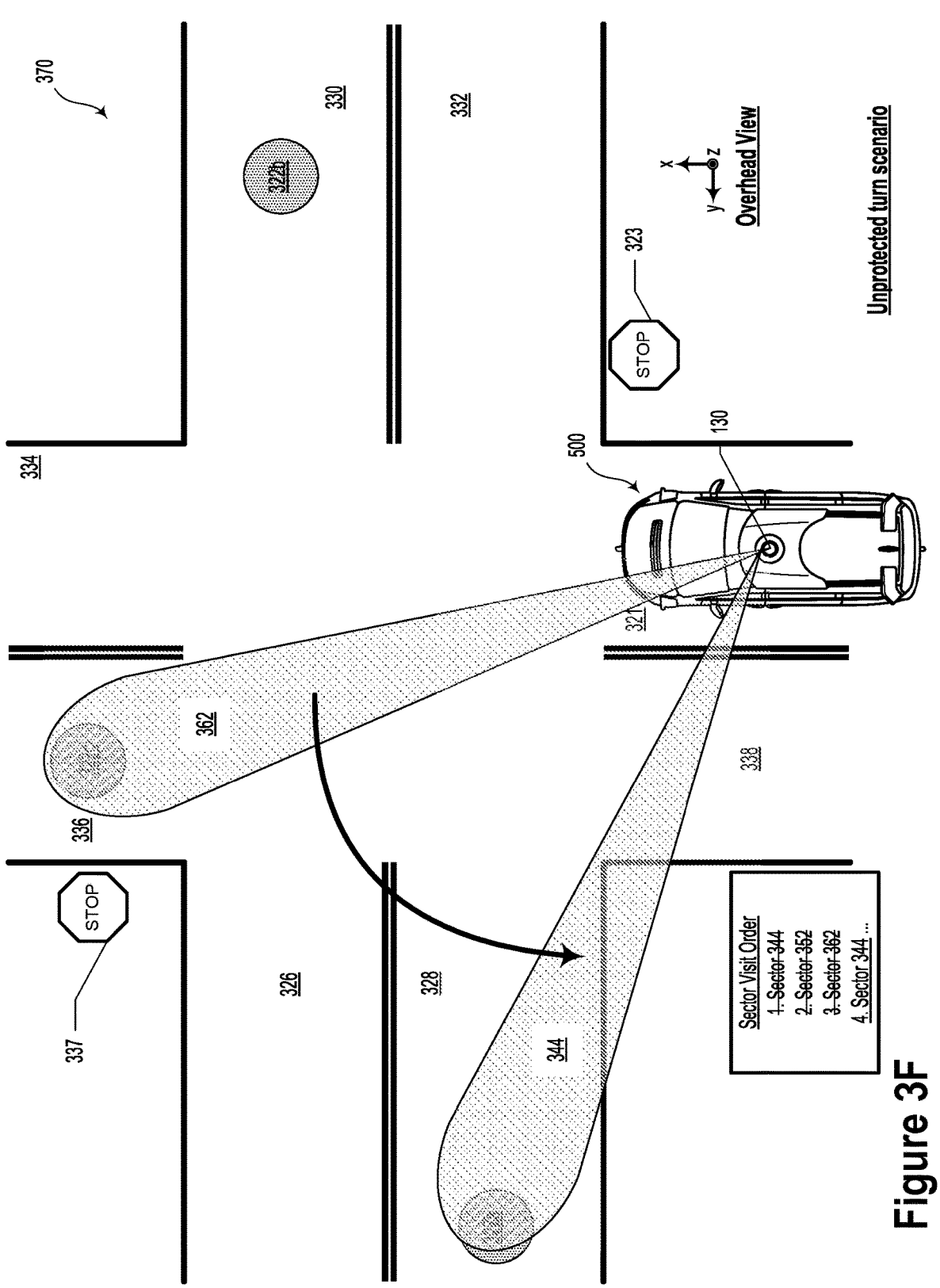
FIG. 3F illustrates a scenario involving the system of FIG. 1, according to an example embodiment.

FIG. 3F illustrates a scenario 370 involving the system 100 of FIG. 1, according to an example embodiment. In such a scenario, the lidar unit 130 of system 100 may rotate or slew an adjustable mount in azimuthal angle from sector 362 back to highest-priority sector 344, which includes the point of interest 322*a*. That is, in some embodiments, the lidar unit 130 may be configured to repeat the same scanning cycle, jumping from one sector to the next, based on priority score and/or sector visit order. Scenario 370 may include the lidar unit 130 re-scanning the sector 344 so as to obtain the latest possible information about potential objects (or absence thereof).

FIG. 4A illustrates a scenario 400 involving the system 100 of FIG. 1, according to an example embodiment. Scenario 400 could be based on a highway merging scenario where a vehicle 500 in roadway 402 is merging onto a highway 404 with the intention of proceeding along trajectory 403. In such a scenario, the planner unit 110 could identify point of interest 412*a*, which could correspond to potential vehicles approaching from closest lane 406 and farthest lane 408. The planner unit 110 could also identify point of interest 412*b*, which may correspond to a slow-moving or stopped vehicle in forward lane 410.

As illustrated, the planner unit 110 could assign priority scores to the points of interest based on, for example, the approach speed of vehicles present in the given locations among other factors. For example, point of interest 412*a* could be assigned a priority score of 9 while point of interest 412*b* could be assigned a priority score of 6.

Subsequent to priority score assignment, the perception unit 120 could partition the environment into sectors that each include at least one point of interest. In scenario 400, point of interest 412*a* could be larger than a single sector azimuth angle range. Accordingly, in some examples, as described below, two sectors may be assigned to a single point of interest.

Figure 4B:
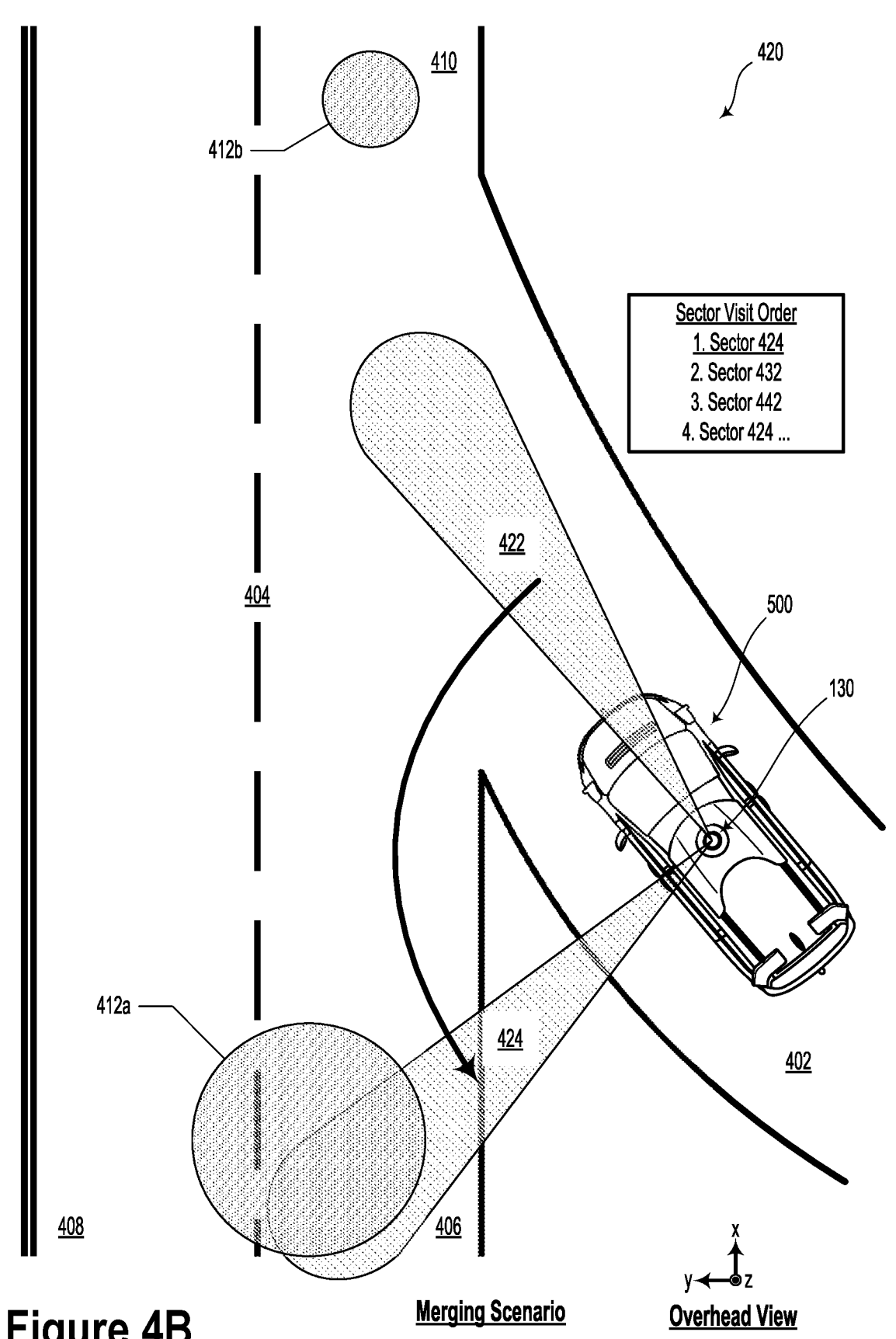
FIG. 4B illustrates a scenario involving the system of FIG. 1, according to an example embodiment.

FIG. 4B illustrates a scenario 420 involving the system 100 of FIG. 1, according to an example embodiment. Scenario 420 could include slewing or rotating the lidar unit 130 counterclockwise (when viewed overhead) from an initial sector 422 to sector 424, which may correspond to one of the two sectors assigned to highest-priority score point of interest 412*a*. Once oriented along the desired pointing direction, the lidar unit 130 may be configured to scan the sector 424.

Figure 4C:
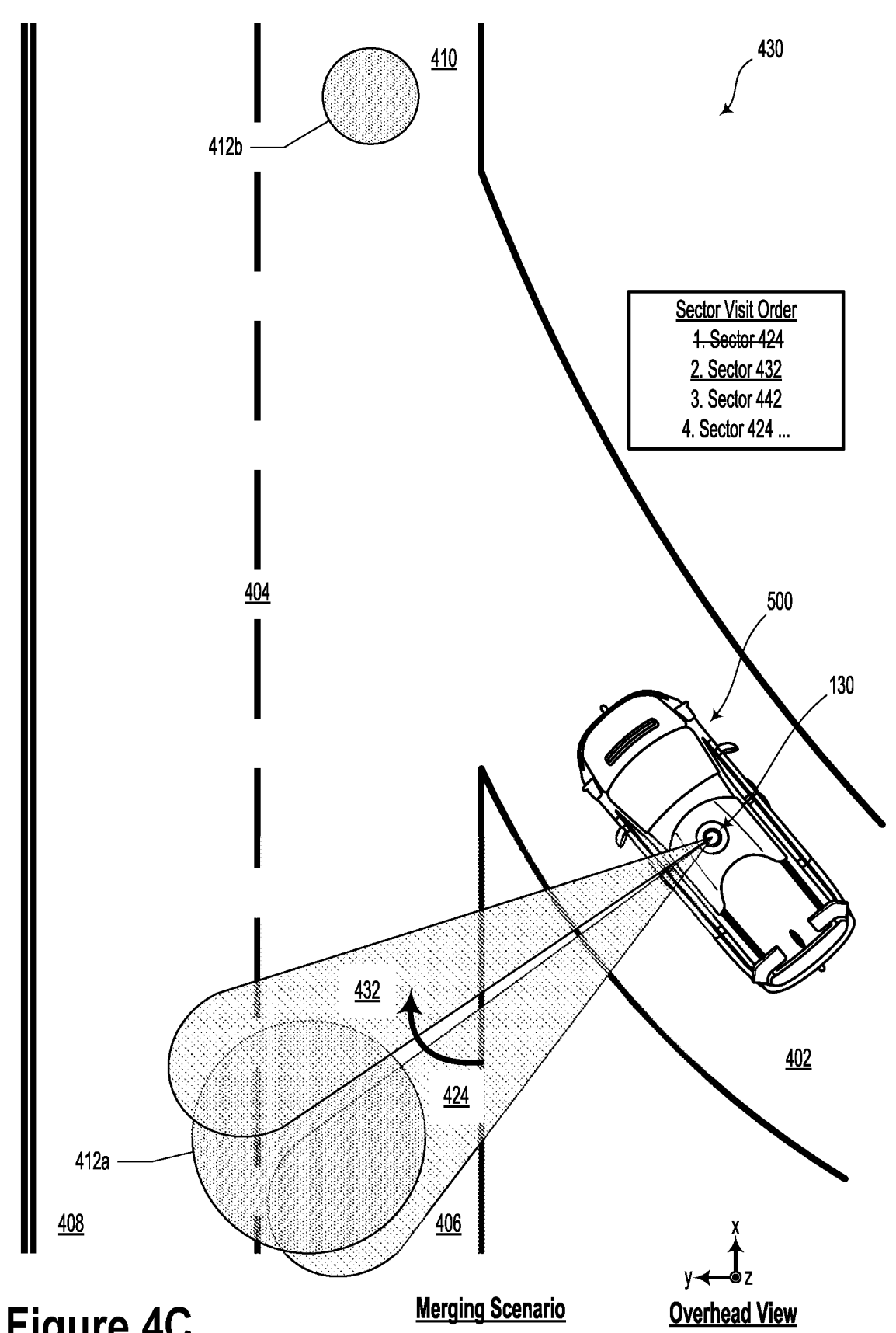
FIG. 4C illustrates a scenario involving the system of FIG. 1, according to an example embodiment.
Figure 5A:
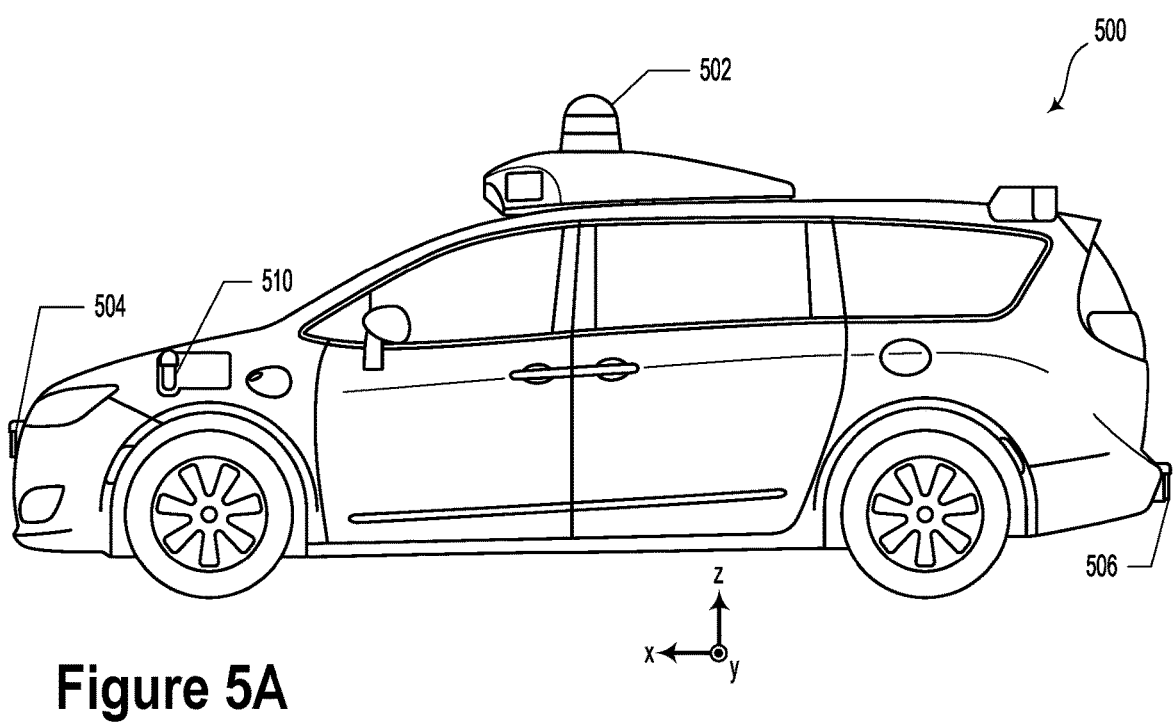
FIG. 5A illustrates a vehicle, according to an example embodiment.
Figure 5B:
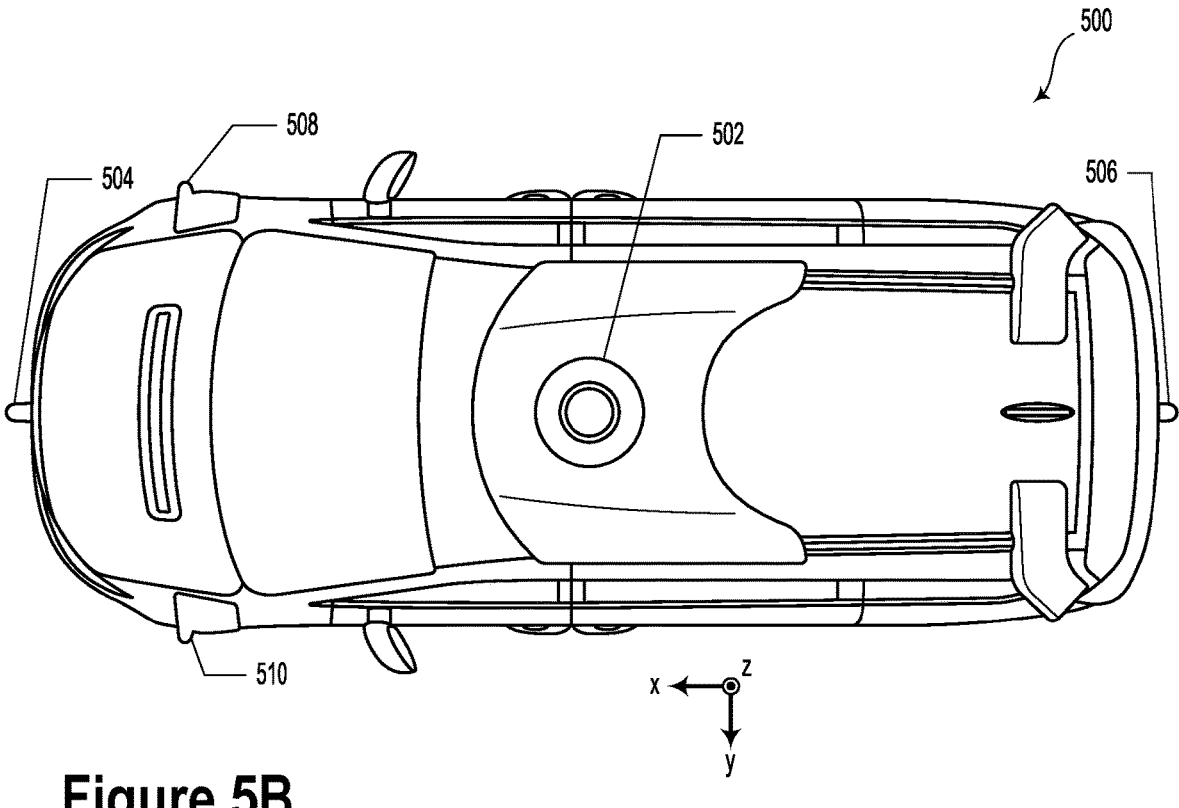
FIG. 5B illustrates a vehicle, according to an example embodiment.
Figure 5C:
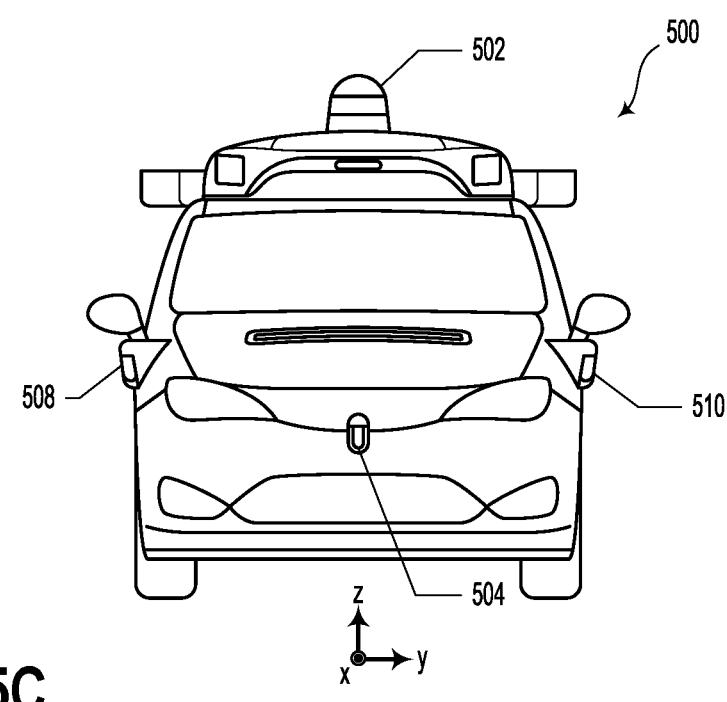
FIG. 5C illustrates a vehicle, according to an example embodiment.
Figure 5D:
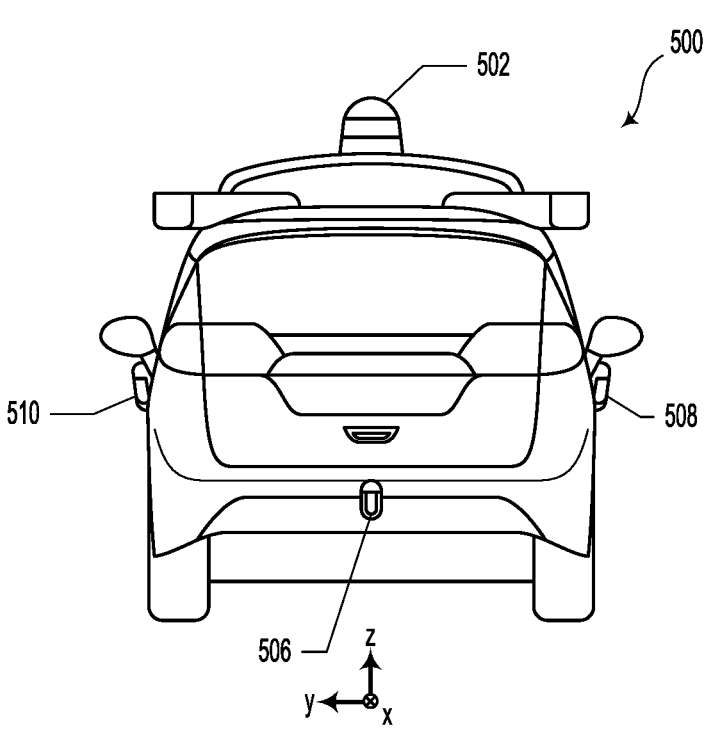
FIG. 5D illustrates a vehicle, according to an example embodiment.
Figure 5E:
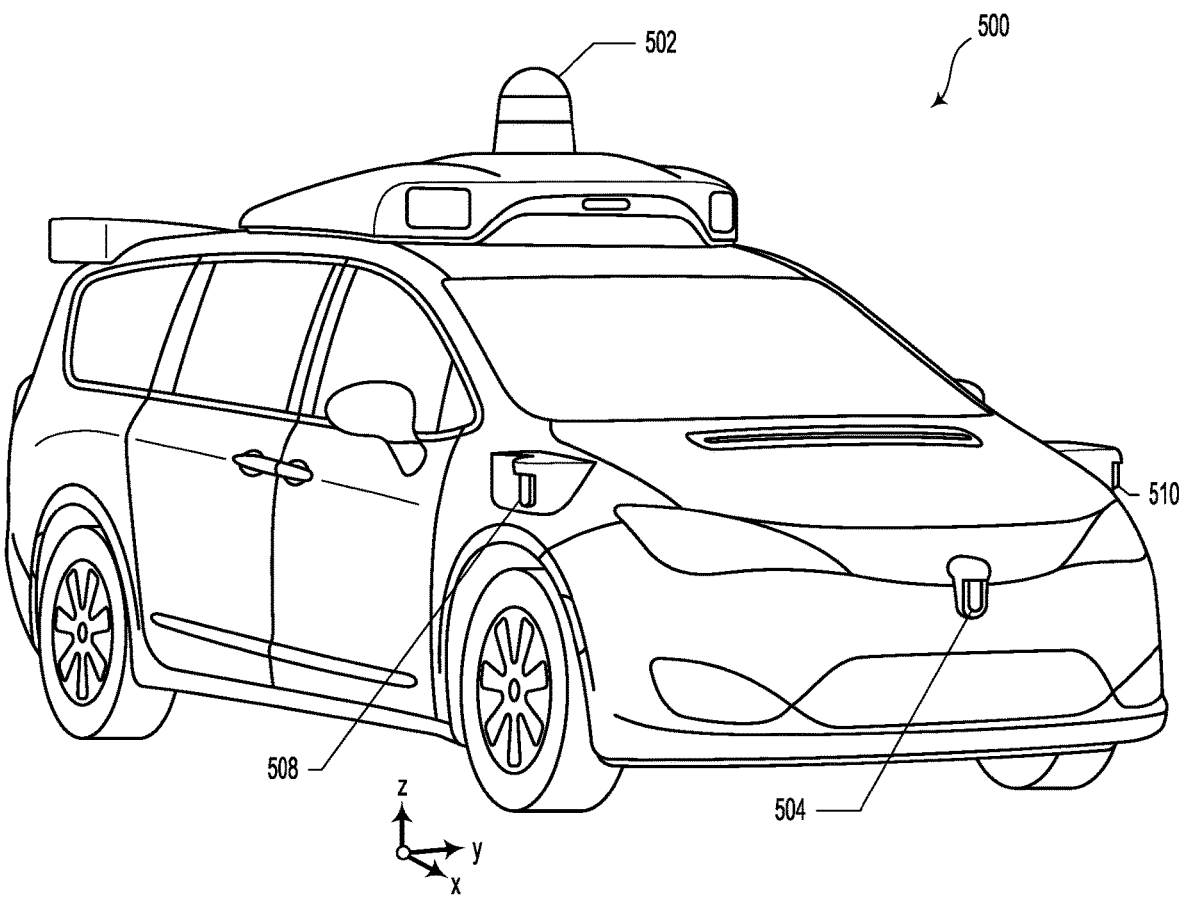
FIG. 5E illustrates a vehicle, according to an example embodiment.

FIG. 4C illustrates a scenario 430 involving the system 100 of FIG. 1, according to an example embodiment. Scenario 430 could include slewing or rotating the lidar unit 130 clockwise (when viewed overhead) from sector 424 to sector 432, which may correspond to the second of the two sectors assigned to highest-priority score point of interest 412*a*. Once oriented along the desired pointing direction, the lidar unit 130 may be configured to scan the sector 432.

FIG. 4D illustrates a scenario 440 involving the system 100 of FIG. 1, according to an example embodiment. Scenario 440 could include slewing or rotating the lidar unit 130 clockwise (when viewed overhead) from sector 432 to sector 442, which may correspond to the lower-priority score point of interest 412*b*. Once oriented along the desired pointing direction, the lidar unit 130 may be configured to scan the sector 442.

FIG. 4E illustrates a scenario 450 involving the system 100 of FIG. 1, according to an example embodiment. Scenario 450 could include slewing or rotating the lidar unit 130 counterclockwise (when viewed overhead) from sector 442 to sector 424, which may correspond to the first of two sectors given the highest priority score. Once oriented along the desired pointing direction, the lidar unit 130 may be configured to scan the sector 424.

III. Example Vehicles

FIGS. 5A, 5B, 5C, 5D, and 5E illustrate a vehicle 500, according to an example embodiment. In some embodiments, the vehicle 500 could be a semi- or fully-autonomous vehicle. While FIGS. 5A, 5B, 5C, 5D, and 5E illustrates vehicle 500 as being an automobile (e.g., a passenger van), it will be understood that vehicle 500 could include another type of autonomous vehicle, robot, or drone that can navigate within its environment using sensors and other information about its environment.

The vehicle 500 could include a planner unit (e.g., planner unit 110). The planner unit could include a planner controller (e.g., planner controller 112) operable to carry out planner operations. The planner operations could include determining a plurality of points of interest within an environment (e.g., environment 10) of the vehicle 500.

The planner operations could include assigning, to each point of interest of the plurality of points of interest, a respective priority score (e.g., priority score(s) 117).

The vehicle 500 includes a perception unit (e.g., perception unit 120), which may include a perception controller (e.g., perception controller 122) operable to carry out perception operations. The perception operations could include partitioning the environment of the vehicle 500 into a plurality of sectors (e.g., plurality of sectors 127). Each sector of the plurality of sectors includes at least one point of interest (e.g., points of interest 119).

The vehicle 500 includes a lidar unit (e.g., lidar unit 130). The lidar unit includes an adjustable mount (e.g., adjustable mount 132). The adjustable mount is operable to rotate the lidar unit toward a respective sector of the plurality of sectors.

Additionally or alternatively, the vehicle 500 may include one or more sensor systems 502, 504, 506, 508, and 510. In some embodiments, sensor systems 502, 504, 506, 508, and 510 could include system 100 as illustrated and described in relation to FIG. 1. In other words, the systems described elsewhere herein could be coupled to the vehicle 500 and/or could be utilized in conjunction with various operations of the vehicle 500. As an example, the system 100 could be utilized in self-driving or other types of navigation, planning, perception, and/or mapping operations of the vehicle 500.

While the one or more sensor systems 502, 504, 506, 508, and 510 are illustrated on certain locations on vehicle 500, it will be understood that more or fewer sensor systems could be utilized with vehicle 500. Furthermore, the locations of such sensor systems could be adjusted, modified, or otherwise changed as compared to the locations of the sensor systems illustrated in FIGS. 5A, 5B, 5C, 5D, and 5E.

In some embodiments, the one or more sensor systems 502, 504, 506, 508, and 510 could include image sensors. Additionally or alternatively the one or more sensor systems 502, 504, 506, 508, and 510 could include lidar sensors. For example, the lidar sensors could include a plurality of light-emitter devices arranged over a range of angles with respect to a given plane (e.g., the x-y plane). For example, one or more of the sensor systems 502, 504, 506, 508, and 510 may be configured to rotate about an axis (e.g., the z-axis) perpendicular to the given plane so as to illuminate an environment around the vehicle 500 with light pulses. Based on detecting various aspects of reflected light pulses (e.g., the elapsed time of flight, polarization, intensity, etc.), information about the environment may be determined.

In an example embodiment, sensor systems 502, 504, 506, 508, and 510 may be configured to provide respective point cloud information that may relate to physical objects within the environment of the vehicle 500. While vehicle 500 and sensor systems 502, 504, 506, 508, and 510 are illustrated as including certain features, it will be understood that other types of sensor systems are contemplated within the scope of the present disclosure.

While lidar systems with single light-emitter devices are described and illustrated herein, lidar systems with multiple light-emitter devices (e.g., a light-emitter device with multiple laser bars on a single laser die) are also contemplated. For example, light pulses emitted by one or more laser diodes may be controllably directed about an environment of the system. The angle of emission of the light pulses may be adjusted by a scanning device such as, for instance, a mechanical scanning mirror and/or a rotational motor. For example, the scanning devices could rotate in a reciprocating motion about a given axis and/or rotate about a vertical axis. In another embodiment, the light-emitter device may emit light pulses towards a spinning prism mirror, which may cause the light pulses to be emitted into the environment based on an angle of the prism mirror angle when interacting with each light pulse. Additionally or alternatively, scanning optics and/or other types of electro-opto-mechanical devices are possible to scan the light pulses about the environment. While FIGS. 5A-5E illustrate various lidar sensors attached to the vehicle 500, it will be understood that the vehicle 500 could incorporate other types of sensors.

IV. Example Methods

FIG. 6 illustrates a method 600, according to an example embodiment. It will be understood that the method 600 may include fewer or more steps or blocks than those expressly illustrated or otherwise disclosed herein. Furthermore, respective steps or blocks of method 600 may be performed in any order and each step or block may be performed one or more times. In some embodiments, some or all of the blocks or steps of method 600 may relate to elements of system 100 and/or vehicle 500 as illustrated and described in relation to FIG. 1 and FIG. 5, respectively. Furthermore, some or all of the block or steps of method 600 may relate to various operations 200 of the system 100 as illustrated and described in relation to FIG. 2. Additionally or alternatively, steps or blocks of method 600 may relate to any of scenarios 300, 320, 340, 350, 360, 370, 400, 420, 430, 440, or 450, as illustrated and described in relation to FIGS. 3A-3F and 4A-4E, respectively.

Block 602 includes determining a plurality of points of interest (e.g., points of interest 306*a*, 306*b*, and/or 306*c*, etc.) within an environment (e.g., environment 10) of a vehicle (e.g., vehicle 500). In some embodiments, the points of interest could correspond to locations from which one or more other vehicles (e.g., other vehicles 12) are likely to approach.

Block 604 includes assigning, to each point of interest of the plurality of points of interest, a respective priority score.

Block 606 includes partitioning at least a portion of the environment of the vehicle into a plurality of sectors (e.g., sectors 304*a*, 304*b*, 304*c*, and 304*d*, etc.). Each sector of the plurality of sectors includes at least one point of interest.

Block 608 includes, for each sector of the plurality of sectors, adjusting a pointing direction (e.g., pointing direction 136) or a scanning region (e.g., scanning region 137) of a lidar unit (e.g., lidar unit 130) corresponding with the respective sector.

Block 610 includes, for each sector of the plurality of sectors, causing the lidar unit to scan the respective sector.

In some embodiments, method 600 may include determining, for each point of interest, a respective intersection time (e.g., intersection times 115). The respective intersection time could be based on a future time when another (actual or potential) vehicle approaching from the respective point of interest is predicted to intersect a current trajectory or a potential trajectory of the vehicle. In such scenarios, the respective priority scores could be substantially inversely proportional to the respective intersection time.

In some embodiments, partitioning at least a portion of the environment of the vehicle into the plurality of sectors could be based on the assigned priority score of at least one point of interest.

Furthermore, in various examples, each sector of the plurality of sectors could include a predetermined azimuth angle range. For example, the predetermined azimuth angle range could be between five degrees and fifteen degrees.

In some embodiments, adjusting the pointing direction of the lidar unit could include causing an actuator to rotate the lidar unit to a pointing direction or an azimuthal angle corresponding to the respective sector.

In example embodiments, causing the lidar unit to scan the respective sector could include emitting at least one light pulse into the respective sector and receiving at least one reflected light pulse from the environment. In such scenarios, causing the lidar unit to scan the respective sector could also include determining, based on an emission time of the at least one light pulse, a time of flight of the reflected light pulse. Additionally, causing the lidar unit to scan the respective sector may additionally include determining a distance to an object in the respective sector based on the time of flight.

In some examples, method 600 could additionally include determining a visit order (e.g., visit order 128) of the plurality of sectors. In such scenarios, determining the visit order could be based on at least one of: a number of points of interest in a given sector, the respective priority scores for the points of interest in a given sector, an angular slew rate of the lidar unit, or an azimuthal angle difference between respective sectors of the plurality of sectors.

In various embodiments, the adjusting and causing steps for each sector of the plurality of sectors could be performed according to the determined visit order.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A method comprising:

determining a plurality of points of interest within an environment of a vehicle;

assigning, to each point of interest of the plurality of points of interest, a respective deadline;

partitioning at least a portion of the environment of the vehicle into a plurality of sectors such that each sector of the plurality of sectors includes at least one point of interest;

determining a schedule for scanning the plurality of sectors by a lidar unit, wherein determining the schedule for scanning the plurality of sectors comprises determining a visit order of the plurality of sectors such that each point of interest can be scanned by its respective deadline; and for each sector of the plurality of sectors:

adjusting a scanning region of the lidar unit corresponding with the respective sector in accordance with the schedule; and causing the lidar unit to scan the respective sector in accordance with the schedule.

2. The method of claim 1, wherein the points of interest correspond to locations from which one or more other vehicles are likely to approach.

3. The method of claim 2, wherein each respective deadline is assigned based on a respective intersection time, wherein the respective intersection time is based on when another vehicle approaching from the respective point of interest would be predicted to intersect a current trajectory or a potential trajectory of the vehicle.

4. The method of claim 1, wherein the partitioning of the at least the portion of the environment of the vehicle into the plurality of sectors is based on an angular field of the lidar unit such that each sector of the plurality of sectors has an azimuthal angular width that corresponds to the angular field of view of the lidar unit.

5. The method of claim 1, wherein adjusting the scanning region of the lidar unit comprises causing an actuator to rotate the lidar unit to an azimuthal angle corresponding to the respective sector so as to change a pointing direction of the lidar unit.

6. The method of claim 1, wherein causing the lidar unit to scan the respective sector comprises:

emitting at least one light pulse into the respective sector;

receiving at least one reflected light pulse from the environment; and determining, based on an emission time of the at least one light pulse, a time of flight of the reflected light pulse; and determining a distance to an object in the respective sector based on the time of flight.

7. A system comprising:

a planner unit comprising a planner controller operable to determine a plurality of points of interest within an environment of the system and to assign a respective deadline to each point of interest of the plurality of points of interest;

a perception unit comprising a perception controller operable to carry out operations, the operations comprising:

partitioning at least a portion of the environment of the system into a plurality of sectors such that each sector of the plurality of sectors includes at least one point of interest; and determining a schedule for scanning the plurality of sectors by a lidar unit, wherein the lidar unit is operable to adjust a scanning region to correspond with a respective sector of the plurality of sectors in accordance with the schedule, and wherein determining the schedule for scanning the plurality of sectors comprises determining a visit order of the plurality of sectors such that each point of interest can be scanned by its respective deadline.

8. The system of claim 7, wherein the points of interest correspond to locations from which one or more other vehicles are likely to approach.

9. The system of claim 8, wherein each respective deadline is based on a respective intersection time, wherein the respective intersection time is based on when another vehicle approaching from the respective point of interest is predicted to intersect a current trajectory or a potential trajectory of the system.

10. The system of claim 7, wherein the partitioning of the at least the portion of the environment of the system into the plurality of sectors is based on an angular field of the lidar unit such that each sector of the plurality of sectors has an azimuthal angular width that corresponds to the angular field of view of the lidar unit.

11. The system of claim 7, further comprising an adjustable mount and an actuator operable to rotate the lidar unit to an azimuthal angle corresponding to the respective sector.

12. The system of claim 7, further comprising the lidar unit, wherein the lidar unit comprises:

at least one light-emitter device;

at least one light-detector device; and a lidar controller operable to carry out operations, the operations comprising:

scanning each respective sector of the plurality of sectors by:

emitting at least one light pulse into the respective sector;

receiving at least one reflected light pulse from the environment;

determining, based on an emission time of the at least one light pulse, a time of flight of the reflected light pulse; and determining a distance to an object in the respective sector based on the time of flight.

13. The method of claim 1, wherein determining the visit order of the plurality of sectors such that each point of interest can be scanned by its respective deadline comprises:

determining the visit order based on the respective deadlines for the points of interest in one or more sectors.

14. The method of claim 1, wherein determining the visit order of the plurality of sectors such that each point of interest can be scanned by its respective deadline comprises:

determining the visit order based on an angular slew rate of the lidar unit.

15. The method of claim 1, wherein determining the visit order of the plurality of sectors such that each point of interest can be scanned by its respective deadline comprises:

determining the visit order based on an azimuthal angle difference between respective sectors of the plurality of sectors.

16. The system of claim 7, wherein determining the visit order of the plurality of sectors such that each point of interest can be scanned by its respective deadline comprises:

determining the visit order based on the respective deadlines for the points of interest in one or more sectors.

17. The system of claim 7, wherein determining the visit order of the plurality of sectors such that each point of interest can be scanned by its respective deadline comprises:

determining the visit order based on an angular slew rate of the lidar unit.

18. The system of claim 7, wherein determining the visit order of the plurality of sectors such that each point of interest can be scanned by its respective deadline comprises:

determining the visit order based on an azimuthal angle difference between respective sectors of the plurality of sectors.

19. The method of claim 1, wherein partitioning at least the portion of the environment of the vehicle into a plurality of sectors such that each sector of the plurality of sectors includes at least one point of interest comprises:

aggregating the points of interest into sectors based on physical distance between points of interest.

20. The system of claim 7, wherein partitioning at least a portion of the environment of the system into a plurality of sectors such that each sector of the plurality of sectors includes at least one point of interest comprises:

aggregating the points of interest into sectors based on physical distance between points of interest.

* * * * *